United States Patent
Sakato et al.

(12) 
(10) Patent No.: US 11,503,237 B2
(45) Date of Patent: Nov. 15, 2022

(54) SOLID STATE IMAGING DEVICE CAPABLE OF ACQUIRING A DESIRED IMAGE WITHOUT USING A FRAME MEMORY, IMAGING APPARATUS, AND IMAGING METHOD

(71) Applicant: CANON KABUSHIKI KAISHA, Tokyo (JP)

(72) Inventors: Kazuma Sakato, Kawasaki (JP); Yohei Horikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/067,471

(22) Filed: Oct. 9, 2020

(65) Prior Publication Data

US 2021/0029315 A1 Jan. 28, 2021

Related U.S. Application Data

(63) Continuation of application No. PCT/JP2019/015381, filed on Apr. 9, 2019.

(30) Foreign Application Priority Data

Apr. 12, 2018 (JP) ................. 2018-077027

(51) Int. Cl.
*H04N 5/369* (2011.01)
*H04N 5/347* (2011.01)

(52) U.S. Cl.
CPC .......... *H04N 5/3696* (2013.01); *H04N 5/347* (2013.01)

(58) Field of Classification Search
CPC .... H04N 5/3696; H04N 5/347; H04N 5/3745; G01J 1/44
See application file for complete search history.

(56) References Cited

U.S. PATENT DOCUMENTS 4,710,817 A * 12/1987 Ando ................ H04N 5/378
348/E5.079
2017/0131143 A1* 5/2017 Andreou ......... H01L 31/035272
(Continued)

FOREIGN PATENT DOCUMENTS

JP 08-147493 A 6/1996
JP 2008-125074 A 5/2008
(Continued)

OTHER PUBLICATIONS

International Search Report of PCT/JP2019/015381 dated Jun. 25, 2019.
(Continued)

*Primary Examiner* — Sinh Tran
*Assistant Examiner* — Angel L Garces-Rivera
(74) *Attorney, Agent, or Firm* — Cowan, Liebowitz & Latman, P.C.

(57) ABSTRACT

Provided are a solid state imaging device, an imaging apparatus, and an imaging method that may acquire a desired image without using a frame memory. The solid state imaging device includes: a sensor unit that generates pulses at a frequency in accordance with a frequency of photon reception; a count unit that generates an image signal by counting the number of signals generated from the sensor unit; and a processing unit that performs a predetermined process on a count value obtained in acquisition of a first image signal, and the count unit combines a second image signal and a value obtained by performing a predetermined process on the count value obtained in the acquisition of the first image signal to generate a third image signal.

11 Claims, 12 Drawing Sheets

(56) References Cited

U.S. PATENT DOCUMENTS

| | | | | |
|---|---|---|---|---|
| 2018/0278877 A1* | 9/2018 | Yamahira | ............. | H04N 5/3742 |
| 2019/0068279 A1* | 2/2019 | Shaw | ..................... | H04B 10/11 |

FOREIGN PATENT DOCUMENTS

| | | | |
|---|---|---|---|
| JP | 2010-041437 | A | 2/2010 |
| JP | 2011-071958 | A | 4/2011 |
| JP | 2011071958 | A | 4/2011 |
| JP | 2012-235265 | A | 11/2012 |
| JP | 2013-005088 | A | 1/2013 |
| JP | 2013005088 | A | 1/2013 |
| JP | 2015-173432 | A | 10/2015 |
| WO | 2017/098710 | A1 | 6/2017 |
| WO | 2017098710 | A1 | 6/2017 |

OTHER PUBLICATIONS

PCT/IB/326 (PCT Notification Concerning Transmittal of International Preliminary Report on Patentability).
PCT/IB/373 (PCT International Preliminary Report on Patentability).
PCT/ISA/237 (PCT Written Opinion of the International Searching Authority).
PCT/IB/338 (PCT Notification of Transmittal of Translation of the International Preliminary Report on Patentability).
Jun. 7, 2022 Japanese Office Action, which is enclosed without an English Translation, that issued in Japanese Patent Application No. 2018-077027.

* cited by examiner

| GAIN_PARAM \ RST_B IT | RST_B IT3 | RST_B IT2 | RST_B IT1 | RST_B IT0 |
|---|---|---|---|---|
| 3 | CNT(0) | 0 | 0 | 0 |
| 2 | CNT(1) | CNT(0) | 0 | 0 |
| 1 | CNT(2) | CNT(1) | CNT(0) | 0 |
| 0 | CNT(3) | CNT(2) | CNT(1) | CNT(0) |
| -1 | 0 | CNT(3) | CNT(2) | CNT(1) |
| -2 | 0 | 0 | CNT(3) | CNT(2) |
| -3 | 0 | 0 | 0 | CNT(3) |
| -4 | 0 | 0 | 0 | 0 | ent
SOLID STATE IMAGING DEVICE CAPABLE OF ACQUIRING A DESIRED IMAGE WITHOUT USING A FRAME MEMORY, IMAGING APPARATUS, AND IMAGING METHOD

CROSS-REFERENCE TO RELATED APPLICATIONS

This application is a Continuation of International Patent Application No. PCT/JP2019/015381, filed Apr. 9, 2019, which claims the benefit of Japanese Patent Application No. 2018-077027, filed Apr. 12, 2018, both of which are hereby incorporated by reference herein in their entirety.

BACKGROUND OF THE INVENTION

Field of the Invention

The present disclosure relates to a solid state imaging device, an imaging apparatus, and an imaging method.

Description of the Related Art

It is known to produce a desired image by using a plurality of pixel signals to perform composition. Such image composition may be, for example, a black-subtracted image, a motion blur, or the like. The black-subtracted image is produced by subtracting a value of a black image in accordance with dark current from a value of an original image. Japanese Patent Application Laid-Open No. 2010-41437 discloses that a black-subtracted image is acquired by storing an acquired original image in a frame memory and subtracting a black image from the original image stored in the frame memory. The motion blur is a blur of an image caused when an image of a moving object is captured. Artificial addition of a blur to an image for emphasizing motion of the object is also called a motion blur.

Japanese Patent Application Laid-Open No. H08-147493 discloses an image memory that stores an image produced and an image composed by an image production composite calculation unit.

Further, an image sensor as illustrated in Japanese Patent Application Laid-Open No. 2015-173432 has been proposed as an image sensor of a novel scheme. In the image sensor disclosed in Japanese Patent Application Laid-Open No. 2015-173432, each pixel has a signal processing circuit as follows. In the image sensor of Japanese Patent Application Laid-Open No. 2015-173432, each pixel has an accumulation capacitor that accumulates charges generated by a photoelectric conversion element, a comparator that compares the voltage of the accumulation capacitor with a reference voltage and outputs a pulse if both the voltages are the same, and a reset unit that resets the voltage of the accumulation capacitor back to a reset voltage in accordance with the output of the comparator.

However, it is not always easy to acquire a desired image without using a frame memory.

The present disclosure provides a solid state imaging device, an imaging apparatus, and an imaging method that may acquire a desired image without using a frame memory.

SUMMARY OF THE INVENTION

According to one aspect of an embodiment, provided is a solid state imaging device including: a sensor unit that generates pulses at a frequency in accordance with a frequency of photon reception; a count unit that generates an image signal by counting the number of signals generated from the sensor unit; and a processing unit that performs a predetermined process on a count value obtained in acquisition of a first image signal, and the count unit combines a second image signal and a value obtained by performing a predetermined process on the count value obtained in the acquisition of the first image signal to generate a third image signal.

According to another aspect of an embodiment, provided is a solid state imaging device including: a sensor unit that generates pulses at a frequency in accordance with a frequency of photon reception; and a count unit that counts the number of signals generated from the sensor unit and sets a weight of count in acquisition of a second image signal performed after acquisition of a first image signal to differ from a weight of count in the acquisition of the first image signal.

Further features of the present invention will become apparent from the following description of exemplary embodiments with reference to the attached drawings.

DESCRIPTION OF THE EMBODIMENTS

Embodiments of the present disclosure will be described below in detail with reference to the drawings. Note that the embodiments described below are examples, and the present disclosure is not limited to the following embodiments.

First Embodiment

A solid state imaging device and the control method thereof and an imaging apparatus according to a first embodiment will be described with reference to FIG. 1 to FIG. 7.

Figure 7:
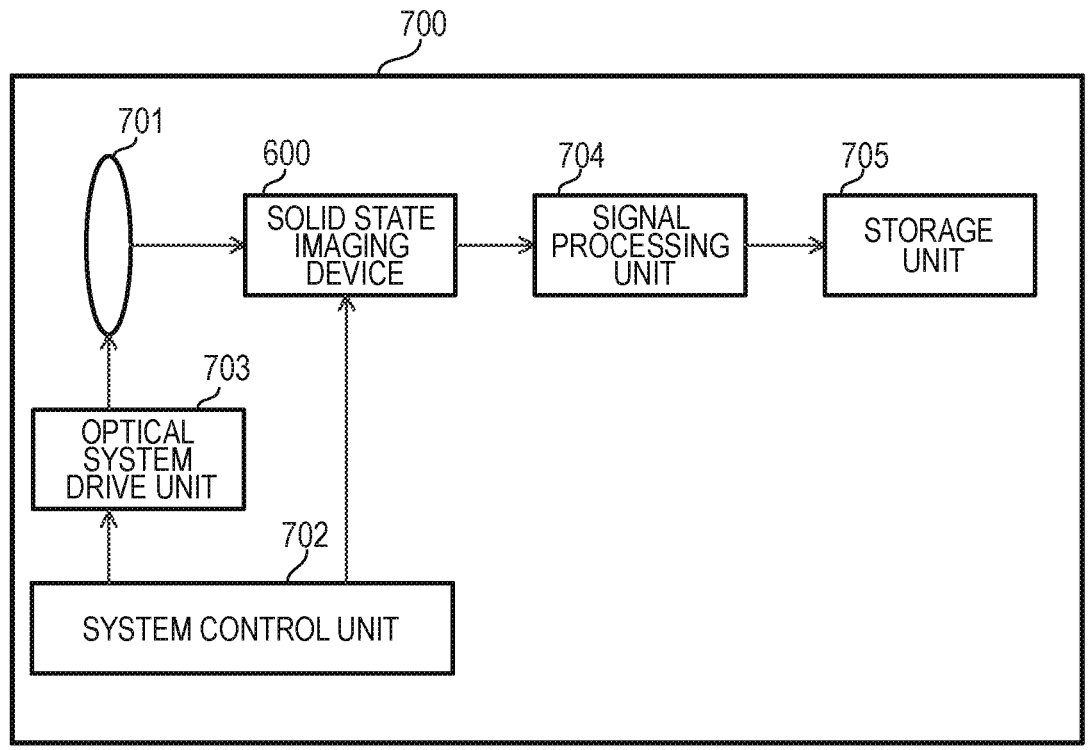
FIG. 7 is a diagram illustrating an imaging apparatus having the solid state imaging device according to the first embodiment.

FIG. 7 is a diagram illustrating an imaging apparatus 700 having a solid state imaging device 600 according to the present embodiment.

The imaging apparatus 700 has the solid state imaging device 600, a system control unit 702, an optical system drive unit 703, a signal processing unit 704, and a storage unit 705. An imaging optical system (lens unit) 701 is provided in the imaging apparatus 700. The imaging optical system 701 may be detachable from a main body of the imaging apparatus 700 or may not be detachable. Further, the imaging apparatus 700 has a display unit and an operation unit (not illustrated). The display unit is used for display of an image or display of menu or the like, and the operation unit is used for operations to indicate an icon or the like on the display or the like or set various parameters or the like.

The imaging optical system 701 has an optical lens group including a focusing lens used for adjusting focus. The imaging optical system 701 further has a shutter, an aperture, a lens control unit, or the like. The imaging optical system 701 captures an optical image of an object on an imaging plane of the solid state imaging device 600.

The system control unit 702 is responsible for overall control of the imaging apparatus 700. The system control unit 702 supplies drive information to the optical system drive unit 703 that drives the imaging optical system 701. The system control unit 702 supplies information indicating an exposure period, a reading interval, or the like to the solid state imaging device 600. Further, the system control unit 702 includes a CPU and a memory, and the CPU executes various programs stored in the memory.

The optical system drive unit 703 drives the imaging optical system 701 based on a signal supplied from the system control unit 702. In the present embodiment, production of a black image is required as described later. When production of a black image is required as with the present embodiment, a light shielding unit (not illustrated) is provided to the imaging apparatus 700. The light shielding unit may be, for example, a shutter. When image capturing is performed with the solid state imaging device 600 being shielded from light by the light shielding unit, a black image is produced.

The solid state imaging device 600 generates an image signal by performing photoelectric conversion on an optical image captured by the imaging optical system 701. The image signal generated by the solid state imaging device 600 is output to the signal processing unit 704.

The signal processing unit 704 performs predetermined signal processing (image processing) on an image signal supplied from the solid state imaging device 600. The predetermined signal processing may be, for example, color conversion, white balance, or the like. The image signal on which various signal processing is performed is encoded by an encoding unit (not illustrated). The image signal encoded by the encoding unit (image data) is supplied to the storage unit 705.

A storage medium is provided to the storage unit 705. The storage medium may be removable from the storage unit 705 or may not be removable. The storage medium may be, for example, a memory card such as an SD card.

Figures 5, 6:
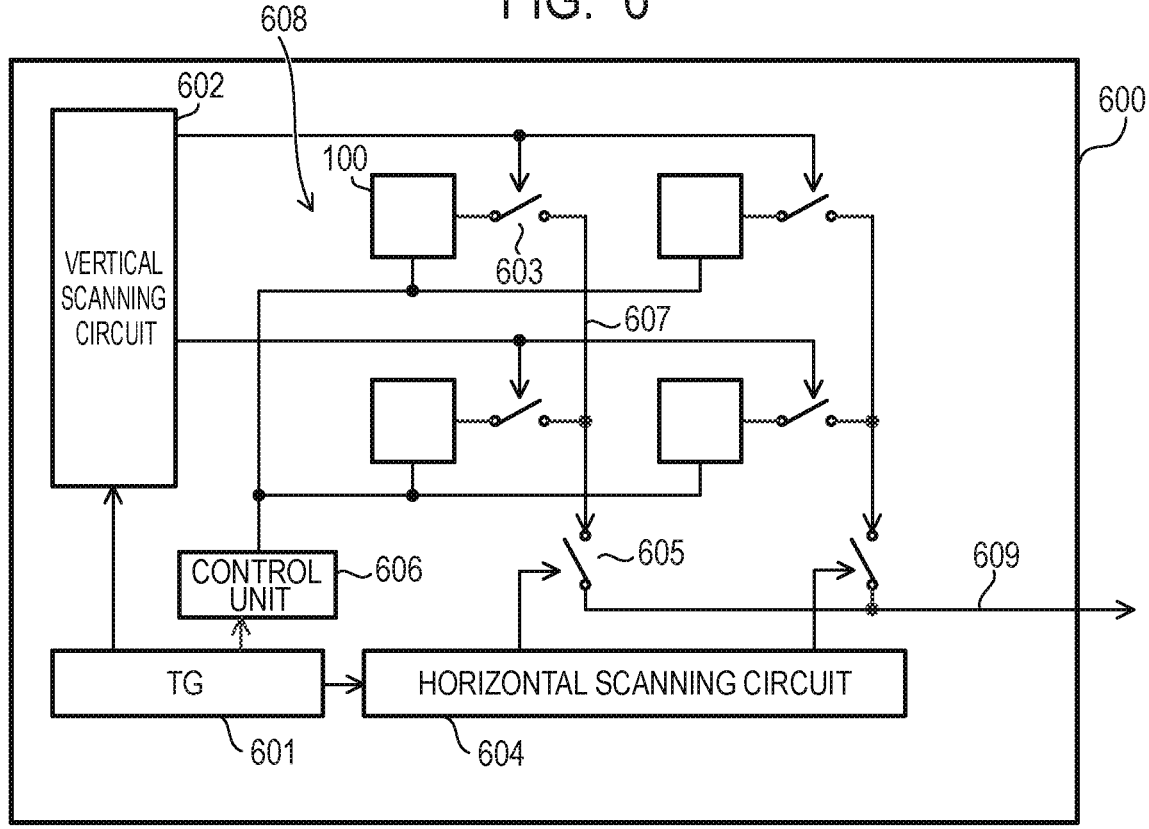
FIG. 5 is a diagram illustrating a bit shift performed in a gain setting unit.
FIG. 6 is a diagram illustrating the solid state imaging device according to the first embodiment.

FIG. 6 is a diagram illustrating the solid state imaging device 600 according to the present embodiment.

A pixel array 608 in which a plurality of unit pixels 100 are two-dimensionally arranged is provided on an imaging plane of the solid state imaging device 600. The solid state imaging device 600 further has a timing generator (TG) 601, a vertical scanning circuit 602, a switch 603, a horizontal scanning circuit 604, a switch 605, and a control unit 606. A pixel value (count value) output from each of the unit pixels 100 is output to the outside of the solid state imaging device 600 via the switch 603, the output signal line 607, the switch 605, and the output signal line 609. The switch 603 is provided in each of the unit pixels 100. The switches 603 are controlled sequentially on a row basis by the vertical scanning circuit 602. The switch 605 is provided in each of the output signal lines 607. The switches 605 are controlled by the horizontal scanning circuit 604.

At a timing of the end of an image capturing period, the vertical scanning circuit 602 supplies a read signal READ_EN (see FIG. 3) to the switch 603. The read signal READ_EN is sequentially supplied to each row. When the read signal READ_EN is supplied to the switch 603, a count value CNT output from the unit pixel 100 is output to the output signal line 607 via the switch 603. The horizontal scanning circuit 604 sequentially controls the switches 605 to sequentially output the count values CNT output from the unit pixels 100 to the outside of the solid state imaging device 600 via the output signal lines 609.

The control unit 606 generates a gain setting signal GAIN_PARAM (see FIG. 2), an inversion signal INV (see FIG. 2), a reset signal CLR (see FIG. 2), and the like based on timing signals supplied from the TG 601. Note that, although signals from the control unit 606 are supplied uniformly to respective unit pixels 100 in the present embodiment, without being limited thereto, the signals may be supplied individually on a row basis or a column basis. In such a case, the vertical scanning circuit 602 may be able to supply signals.

The TG 601 generates timing signals used for controlling an image capturing period, a transfer period, or the like. Various timing signals generated by the TG 601 are supplied to the vertical scanning circuit 602, the horizontal scanning circuit 604, the control unit 606, or the like.

The solid state imaging device 600 according to the present embodiment is to produce a black-subtracted image by subtracting a value of a black image in accordance with dark current from a value of an original image. The dark current is proportional to an exposure period. A black-subtracted image is obtained by setting the exposure period of an original image and the exposure period of a black image to be the same and subtracting the black image obtained in such a way from the original image obtained in such a way. However, when the exposure period of an original image and the exposure period of a black image are set to be the same, a long time is required. Accordingly, the present embodiment intends to reduce the exposure period of a black image by applying a gain to a signal of a black image. In the present embodiment, a case where the ratio of the exposure period of an original image and the exposure period of a black image is 2:1 will be described as an example, however, the embodiment is not limited thereto. When the ratio of the exposure period of an original image and the exposure period of a black image is 2:1, the black image is multiplied by a two-fold gain. Note that, while details will be described later, it is preferable that a reduction ratio of the exposure period be a power of two.

Figure 1:
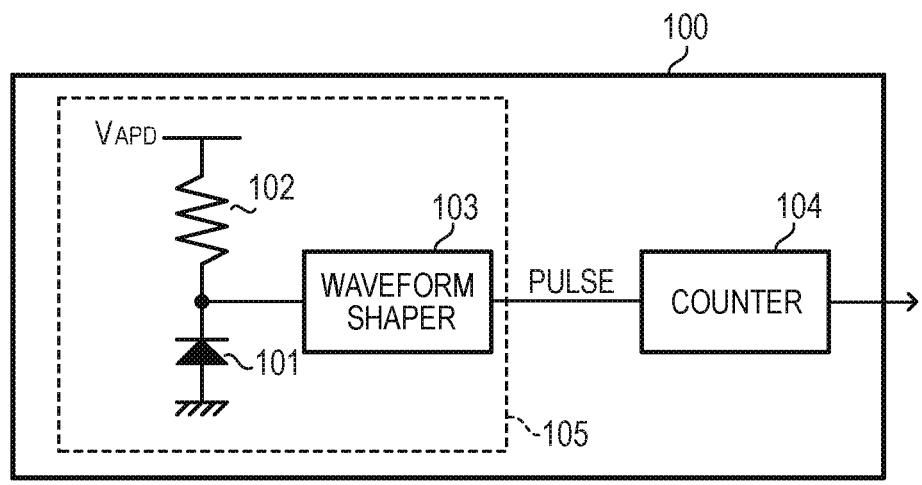
FIG. 1 is a diagram illustrating a unit pixel provided in a solid state imaging device according to a first embodiment.

FIG. 1 is a diagram illustrating the unit pixel 100 provided in the solid state imaging device 600 according to the present embodiment.

The unit pixel 100 has an avalanche photodiode (APD) 101, a quench resistor 102, a waveform shaper 103, and a counter (count unit) 104.

The anode of the APD 101 is connected to a ground potential. The cathode of the APD 101 is connected to one end of the quench resistor 102 and the input terminal of the waveform shaper 103. The other end of the quench resistor 102 is connected to a predetermined potential VAPD that is a reverse bias potential. In such a way, the APD 101 is connected to the predetermined potential VAPD via the quench resistor 102. The predetermined potential VAPD may be a voltage that enables the APD 101 to operate in a Geiger mode, for example, around 30 V.

A sensor unit 105 that generates pulses at a frequency in accordance with a frequency of photon reception is formed of the APD 101, the quench resistor 102, and the waveform shaper 103.

In response to a photon entering the APD 101, a charge occurs due to an avalanche multiplication phenomenon. The charge generated by the avalanche multiplication phenomenon is discharged via the quench resistor 102.

In accordance with generation and discharge of a charge in accordance with incidence of a photon to the APD 101, the potential of a signal input to the waveform shaper 103 changes. The waveform shaper 103 generates a pulsed signal by performing edge detection and amplification on an input signal.

The sensor unit 105 functions as a one-bit type AD conversion unit that converts the presence or absence of a photon entering the APD 101 into a pulse signal.

The counter 104 counts the number of pulse signals PULSE supplied from the waveform shaper 103 and outputs a digital signal indicating a count result to the outside of the unit pixel 100.

The number of pulse signals PULSE counted by the counter 104 is output from the unit pixel 100 as a pixel value.

Figure 2:
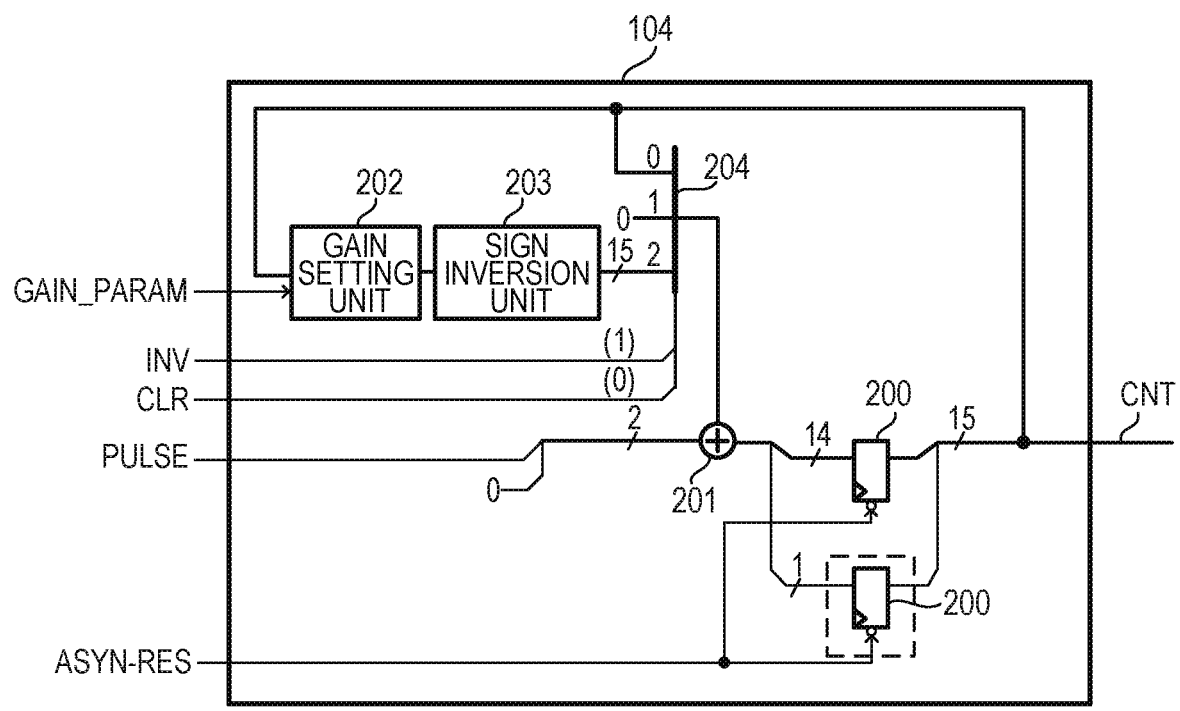
FIG. 2 is a diagram illustrating a counter provided in the unit pixel of the solid state imaging device according to the first embodiment.

FIG. 2 is a diagram illustrating the counter 104 provided in the unit pixel 100.

The counter 104 has flip-flops 200, an adder unit 201, a gain setting unit 202, a sign inversion unit 203, and an initial value selection unit 204. The count value CNT is output from the counter 104. Note that the bit width illustrated in FIG. 2 is an example and not limited thereto.

A plurality of flip-flops 200 are provided in the counter 104. A case in which 15 flip-flops 200 are provided is described here as an example. Each of the flip-flops 200 is reset to an initial value 0 by an asynchronous reset signal ASYN_RES supplied from the control unit 606 asynchronously with a clock signal CLK (see FIG. 3). Note that, in the present embodiment, a common clock signal CLK is supplied to the counter 104 provided in each of the plurality of unit pixels 100 provided in the solid state imaging device 600. Further, in the present embodiment, a common asynchronous reset signal ASYN_RES is simultaneously supplied to the counter 104 provided in each of the plurality of unit pixels 100 provided in the solid state imaging device 600.

The flip-flop 200 of a lower bit of the plurality of flip-flops 200 corresponds to a dead bit. Although a case where one flip-flop 200 of the least significant bit corresponds to a dead bit is described here as an example, the embodiment is not limited thereto. In FIG. 2, the dead bit is illustrated by being surrounded with a dashed line. The pulse signal PULSE is not supplied to the flip-flop 200 of the dead bit. Thus, the output of the flip-flop 200 of the dead bit does not change in the count operation of the counter 104. Since the number of dead bits is one, the count value CNT changes as 0, 2, 4, ..., in the present embodiment.

Note that, although the case where the number of dead bits is one is described as an example in the present embodiment, the embodiment is not limited thereto. The number of dead bits may be two or greater.

The adder unit 201 adds a signal supplied from the initial value selection unit 204 and the pulse signal PULSE supplied from the waveform shaper 103.

The gain setting unit (a gain unit, an amplifier unit) 202 applies, to a signal output from the flip-flop 200, a gain in accordance with a gain setting signal GAIN_PARAM supplied from the control unit 606. A signal to which a gain has been applied by the gain setting unit 202 is output from the gain setting unit 202. In the present embodiment, to prevent increase in the circuit size, the gain setting unit 202 applies a gain by performing a bit shift. For example, when a four-fold gain is applied, the gain setting signal GAIN_PARAM is set to a value 2. When the gain setting signal GAIN_PARAM is set to a value 2, a shift to the left by two bits is performed on a signal output from the flip-flop 200. For example, when a ⅛-fold gain is applied, the gain setting signal GAIN_PARAM is set to a value −3. When the gain setting signal GAIN_PARAM is set to a value −3, a shift to the right by three bits is performed on a signal output from the flip-flop 200.

Note that, although a case of applying a gain by performing a bit shift is described here as an example, the embodiment is not limited thereto. For example, a gain may be applied by using a multiplier. Again is set based on the ratio of an exposure value at capturing of an original image that is a first image (first imaging condition) and an exposure value at capturing of a black image that is a second image (second imaging condition). The exposure value is a value indicating a degree of exposure and determined by an aperture value of the imaging optical system and an exposure period. Although it is preferable that the ratio of the exposure values be a power of two in order to enable application of a gain by using only the bit shift, the embodiment is not limited thereto. For example, when a multiplier is used to apply a gain, the ratio of the exposure values is not required to be a power of two.

The sign inversion unit 203 performs a process of inverting a signal supplied from the gain setting unit 202. When sign inversion is merely performed, complement notation of one is resulted, but complement notation of two is not resulted. In a case of complement notation of one, signal processing may be unable to be performed by an adder with a simple configuration. While an adder used for adding one is required to obtain complement notation of two, the circuit size of the counter 104 will be increased if the adder used for adding one is provided inside the counter 104. Thus, in the present embodiment, the adder used for adding one is not provided inside the counter 104. When an increase in circuit size of the counter 104 is acceptable, the adder used for adding one may be provided inside the counter 104 to realize complement notation of two.

The initial value selection unit 204 is for selecting an initial value to be set for the counter 104. The initial value selection unit 204 selects a signal to be supplied to the adder unit 201 based on the reset signal (clear signal) CLR and the inversion signal INV supplied from the control unit 606.

When both the levels of the reset signal CLR and the inversion signal INV are 0, the initial value selection unit 204 supplies a signal output from the flip-flop 200 to the adder unit 201 without change. In such a case, a pixel signal is accumulated by the flip-flop 200.

When the level of the reset signal CLR is 1 and the level of the inversion signal INV is 0, the initial value selection unit 204 supplies 0 to the adder unit 201. In such a case, the flip-flop 200 is reset to 0.

When the level of the reset signal CLR is 0 and the level of the inversion signal INV is 1, the initial value selection unit 204 supplies a signal inverted by the sign inversion unit 203 to the adder unit 201. For example, a value obtained by applying a gain to and inverting a signal value of the previous frame is set for the flip-flop 200 as an initial value. By using such a value as the initial value to perform counting, it is possible to obtain a difference between the signal value of the previous frame and the signal value of the current frame, for example.

In the present embodiment, a gain in accordance with the ratio of the exposure value at capturing of an original image and the exposure value at capturing of a black image is applied to the signal value of the original image. A value obtained by performing sign inversion on the value obtained by applying a gain to the signal value of the original image is then set for the flip-flop 200 as an initial value when a black image is captured. The black image is then captured, and sign inversion is further performed. In the present embodiment, since such a process is performed, a black-subtracted image obtained by subtracting a black image from an original image can be produced without using a frame memory.

Figure 3:
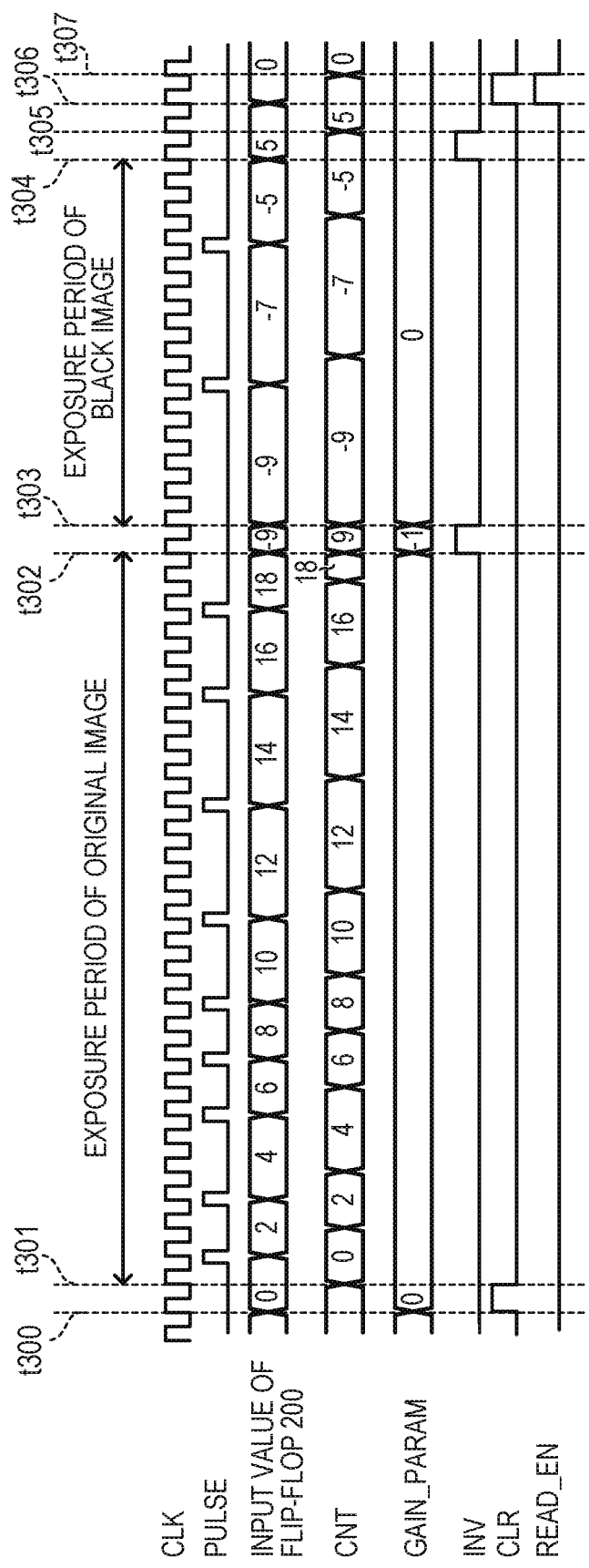
FIG. 3 is a timing chart illustrating the operation of the counter provided in the unit pixel of the solid state imaging device according to the first embodiment.

FIG. 3 is a timing chart illustrating the operation of the counter 104. FIG. 3 illustrates the clock signal CLK, the pulse signal PULSE, the input value of the flip-flop 200, the count value CNT, the gain setting signal GAIN_PARAM, the inversion signal INV, the reset signal CLR, and the read signal READ_EN. The read signal READ_EN is a signal used for outputting the count value CNT of the counter 104 to the output signal line 607. In FIG. 3, the input value of the flip-flop 200 and the count value CNT are indicated by complement notation of one.

At timing t300, the reset signal CLR is set to a H-level. Thereby, the counter 104 is reset. Such reset is performed before capturing of an original image, for example. The gain setting signal GAIN_PARAM is set to 0, that is, the gain is set to one-fold.

The period from timing t301 to timing t302 is an exposure period of the original image. To simplify the illustration here, an example in which a single pulse signal PULSE is output at a timing of a rising edge of the clock signal CLK is illustrated. Every time the pulse signal PULSE is output, the count value CNT is counted up. Since the least significant bit is a dead bit, the count value is incremented two by two. Note that, since the count value CNT is output in synchronization with a rising edge of the clock signal CLK, a delay by one cycle occurs in the count value CNT with respect to the input value of the flip-flop 200.

At timing t302, exposure of the original image is completed. Upon the completion of the exposure of the original image, an initial value is set for the flip-flop 200 as described below in order to proceed to exposure of a black image. That is, the gain setting signal GAIN_PARAM is set based on the ratio of the exposure period of the original image that has already been captured and the exposure period of a black image to be captured. As described above, since the ratio of the exposure period of an original image and the exposure period of a black image is 2:1, for example, the gain of ½-fold, which is an inverse number of the ratio is set to be applied, for example. That is, a one-bit shift to the right is performed on the signal value of the original image. Thus, the value of the gain setting signal GAIN_PARAM is −1. Furthermore, the inversion signal INV is controlled to the H-level, and thereby the value obtained by performing sign inversion on a signal output from the gain setting unit 202 is set for the flip-flop 200 as an initial value when a black image is captured.

Since the inversion signal INV is controlled to the H-level and the gain setting signal GAIN_PARAM is set to a value −1, the following process is performed. That is, for example, a value of 9 is obtained by multiplying a signal value of the original image, for example, 18 by ½, and a value of −9 is obtained by inverting the value of 9. The value −9, for example, obtained in such a way is input to the flip-flop 200 as an initial value when a black image is captured. In such a way, the value of −9, for example, is set for the flip-flop 200 as the initial value when a black image is captured.

As described above, the counter 104 sets a value obtained by performing a predetermined process on a count value obtained in acquisition of the first image signal as a count value used when starting acquisition of the second image signal performed after the acquisition of the first image signal.

Note that, at timing t302, the count value CNT is 9 that is a value obtained by multiplying 18, which is the signal value of the original image, by ½. At timing t303 occurring after one cycle from timing t302, a value −9 that is a value obtained by inverting 9 is the count value CNT.

The period from timing t303 to timing t304 is an exposure period of a black image. Every time the pulse signal PULSE is output from the waveform shaper 103, the count value CNT is counted up. Since the least significant bit is a dead bit, the count value is incremented two by two. The gain setting signal GAIN_PARAM is set to 0, that is, the gain is one-fold.

At timing t304, the exposure of the black image is completed. At timing t304, the inversion signal INV is controlled to the H-level. Thus, a value 5 that is a value obtained by performing sign inversion on the black-subtracted image is input to the flip-flop 200.

At timing t305 delayed by one cycle from timing t304, the value of the count value CNT becomes 5. In such a way, the count value CNT indicating the signal value of the black-subtracted image is obtained.

As can be seen from FIG. 3, the number of pulse signals PULSE during an exposure period of an original image is nine. On the other hand, the number of pulse signals PULSE during an exposure period of a black image is two. The ratio of the exposure period of an original image and the exposure period of a black image is 2:1. Therefore, a black-subtracted image is calculated by the following Equation (1).

$$9 - 2 \times 2 = 5 \tag{1}$$

Thus, it is understood that a black-subtracted image may be preferably acquired according to the present embodiment.

At timing t306, the read signal READ_EN is controlled to the H-level, and a black-subtracted image is read. Further, at timing t306, the reset signal CLR is controlled to the H-level. Accordingly, 0 is input to the flip-flop 200, and at timing t307 occurring after one cycle from timing t306, the count value CNT is reset to 0.

As described above, according to the present embodiment, since a black image is captured in a state where a signal obtained by inverting a signal of an original image is set for the flip-flop 200, a black-subtracted image can be obtained without using a frame memory. Moreover, according to the present embodiment, since a gain is applied based on the ratio of the exposure period of an original image and the exposure period of a black image, the time required for acquiring a black-subtracted image can be reduced.

Note that, although the case where the counter 104 is a synchronous counter has been described above as an example, the embodiment is not limited thereto. For example, a counter 104A as illustrated in FIG. 4, that is, an asynchronous counter may be used.

Figure 4:
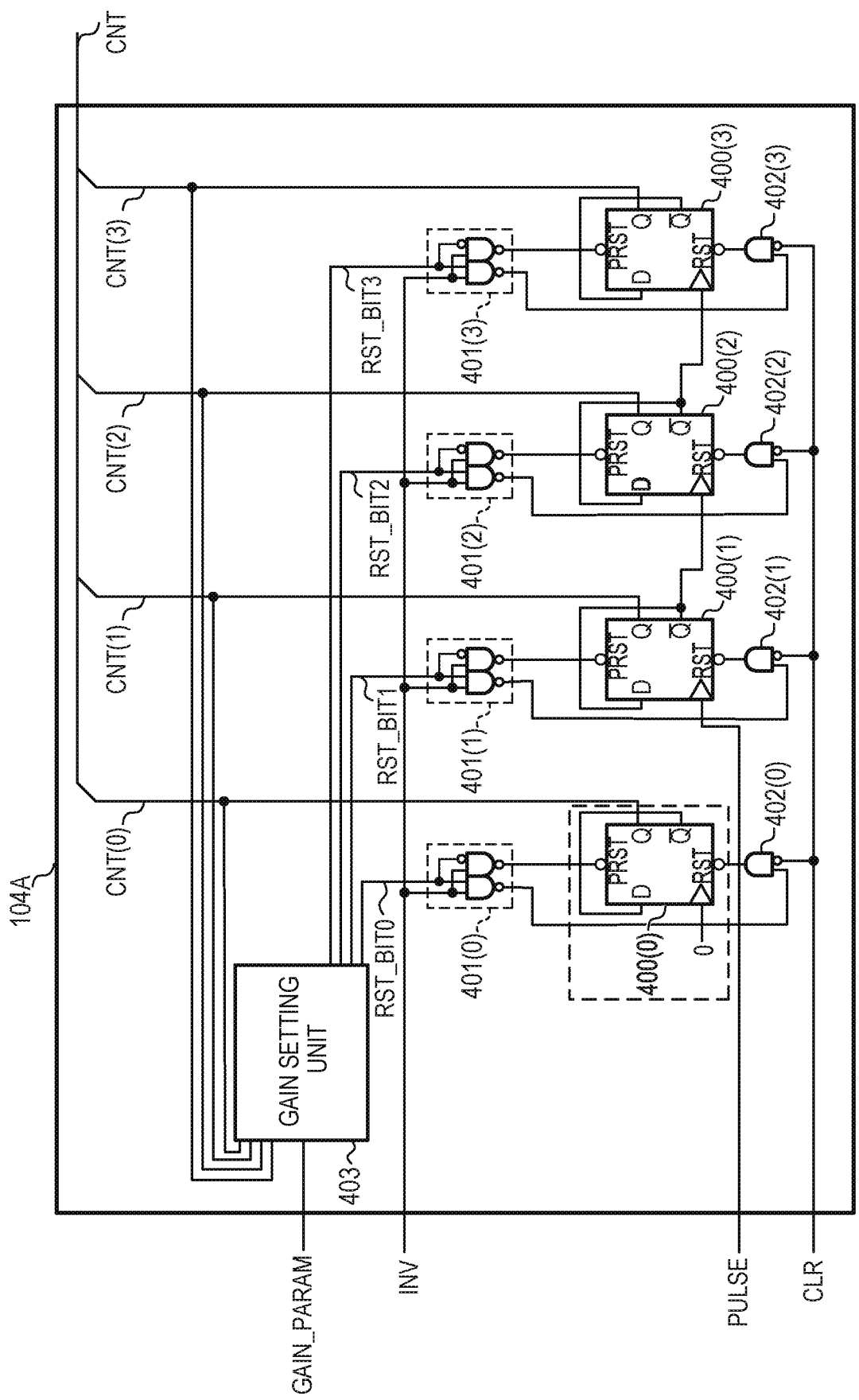
FIG. 4 is a diagram illustrating an example when the counter is formed of an asynchronous counter.

FIG. 4 is a diagram illustrating an example of a case where the counter is formed of an asynchronous counter. The counter 104A illustrated in FIG. 4 is used instead of the counter 104 illustrated in FIG. 1.

The counter 104A has a plurality of flip-flops 400(0) to 400(3), a plurality of sign inversion control units 401(0) to 401(3), a plurality of AND elements 402(0) to 402(3), and a gain setting unit 403.

When a flip-flop is described in a general sense, a reference 400 is used, and when an individual flip-flop is described, any one of references 400(0) to 400(3) is used. When a sign inversion control unit is described in a general sense, a reference 401 is used, and when an individual sign inversion control unit is described, any one of references 401(0) to 401(3) is used. When an AND element is described in a general sense, a reference 402 is used, and when an individual AND element is described, any one of references 402(0) to 402(3) is used.

Although a case where the bit width of the counter 104A is four is described here as an example to simplify the illustration, the bit width of the counter 104A is not limited to four. When a count value is described, a reference CNT is used, and when a count value of an individual bit is described, any one of references CNT(0) to CNT(3) is used. A count value CNT(0) of the 0-th bit is output from the flip-flop 400(0). A count value CNT(1) of the first bit is output from the flip-flop 400(1). A count value CNT(2) of the second bit is output from the flip-flop 400(2). A count value CNT(3) of the third bit is output from the flip-flop 400(3). The ratio of the exposure period of an original image and the exposure period of a black image is 2:1, for example, in the same manner as described above.

When the signal input to the preset terminal PRST is at the L-level, the flip-flop 400 sets the output terminal Q to the H-level and the inverting output terminal/Q to the L-level. When the signal input to the preset terminal PRST is at the H-level, the flip-flop 400 operates as follows in synchronization with a rising edge of the signal input to the clock input terminal. That is, in such a case, the flip-flop 400 outputs a positive logic value of the signal input to the input terminal D to the output terminal Q and outputs a negative logic value of the signal input to the input terminal D to the inverting output terminal/Q. The inverting output terminal/Q of the flip-flop 400 is connected to the input terminal D of the flip-flop 400 of interest. The count values CNT(0) to CNT(3) of respective bits are output from respective output terminals Q of the flip-flops 400(0) to 400(3). When the signal input to the reset terminal RST is at the L-level, the flip-flop 400 sets the output terminal Q to the L-level and the inverting output terminal/Q is to the H-level. When the signal input to the reset terminal RST is at the H-level, the flip-flop 400 operates as follows in synchronization with a rising edge of the signal input to the clock input terminal. That is, in such a case, the flip-flop 400 outputs a positive logic value of the signal input to the input terminal D to the output terminal Q and outputs a negative logic value of the signal input to the input terminal D to the inverting output terminal/Q.

The flip-flop 400(0) of the 0-th bit that is the least significant bit is a dead bit. In FIG. 4, the dead bit is indicated by being surrounded with a chain line. A value 0 is input to the clock input terminal of the flip-flop 400(0) of the 0-th bit that is the least significant bit. The pulse signal PULSE is supplied to the clock input terminal of the flip-flop 400(1) of the first bit. A signal output from the inverting output terminal/Q of the flip-flop 400(1) of the first bit is supplied to the clock input terminal of the flip-flop 400(2) of the second bit. A signal output from the inverting output terminal/Q of the flip-flop 400(2) of the second bit is supplied to the clock input terminal of the flip-flop 400(3) of the third bit. Since the 0-th bit is a dead bit, the count value CNT of the counter 104 is incremented two by two.

The sign inversion control unit 401 outputs a control signal used for sign inversion. The sign inversion control unit 401 supplies signals RST_BIT0 to RST_BIT3 supplied from the gain setting unit 403 to respective preset terminals PRST of the flip-flops 400(0) to 400(3) based on the inversion signal INV. The sign inversion control unit 401 supplies signals RST_BIT0 to RST_BIT3 supplied from the gain setting unit 403 to the AND elements 402(0) to 402(3), respectively, based on the inversion signal INV.

When the reset signal CLR is at the H-level, the AND element 402 supplies a L-level signal to the reset terminal RST of the flip-flop 400. When the reset signal CLR is at the L-level, the AND element 402 supplies a signal supplied from the sign inversion control unit 401 to the reset terminal RST of the flip-flop 400.

The gain setting unit 403 is for setting a gain of the counter 104A. The count values CNT(0) to CNT(3) output from respective output terminals Q of the flip-flops 400(0) to 400(3) are output from the counter 104A and supplied to the gain setting unit 403. The gain setting unit 403 performs a bit shift on the count values CNT(0) to CNT(3) based on the gain setting signal GAIN_PARAM. The count values CNT(0) to CNT(3) on which the bit shift has been performed by the gain setting unit 403 are supplied to the sign inversion control units 401(0) to 401(3), respectively.

FIG. 5 is a diagram illustrating a bit shift performed in the gain setting unit 403.

For example, when the gain setting signal GAIN_PARAM represents 0, since the gain is one-fold, the gain setting unit 403 performs no bit shift. Thus, the count value CNT(0) output from the output terminal Q of the flip-flop 400(0) of the 0-th bit is supplied as the signal RST_BIT0 to the sign inversion control unit 401(0) of the 0th bit. Further, the count value CNT(1) output from the output terminal Q of the flip-flop 400(1) of the first bit is supplied as the signal RST_BIT1 to the sign inversion control unit 401(1) of the first bit. Further, the count value CNT(2) output from the output terminal Q of the flip-flop 400(2) of the second bit is supplied as the signal RST_BIT2 to the sign inversion control unit 401(2) of the second bit. Further, the count value CNT(3) output from the output terminal Q of the flip-flop 400(3) of the third bit is supplied as the signal RST_BIT3 to the sign inversion control unit 401(3) of the third bit.

When the gain setting signal GAIN_PARAM represents 1, since the gain is two-fold, the operation is as follows. A value 0 is supplied to the sign inversion control unit 401(0) of the 0-th bit as the signal RST_BIT0. The count value CNT(0) output from the output terminal Q of the flip-flop 400(0) of the 0-th bit is supplied to the sign inversion control unit 401(1) of the first bit as the signal RST_BIT1. Further, the count value CNT(1) output from the output terminal Q of the flip-flop 400(1) of the first bit is supplied to the sign inversion control unit 401(2) of the second bit as the signal RST_BIT2. Further, the count value CNT(2) output from the output terminal Q of the flip-flop 400(2) of the second bit is supplied to the sign inversion control unit 401(3) of the third bit as the signal RST_BIT3.

When the gain setting signal GAIN_PARAM represents 2, since the gain is four-fold, the operation is as follows. A value 0 is supplied to the sign inversion control unit 401(0) of the 0-th bit as the signal RST_BIT0. A value 0 is supplied to the sign inversion control unit 401(1) of the first bit as the signal RST_BIT1. The count value CNT(0) output from the output terminal Q of the flip-flop 400(0) of the 0-th bit is supplied to the sign inversion control unit 401(2) of the second bit as the signal RST_BIT2. Further, the count value CNT(1) output from the output terminal Q of the flip-flop 400(1) of the first bit is supplied to the sign inversion control unit 401(3) of the third bit as the signal RST_BIT3.

When the gain setting signal GAIN_PARAM represents 3, since the gain is eight-fold, the operation is as follows. A value 0 is supplied to the sign inversion control unit 401(0) of the 0-th bit as the signal RST_BIT0. A value 0 is supplied to the sign inversion control unit 401(1) of the first bit as the signal RST_BIT1. A value 0 is supplied to the sign inversion control unit 401(2) of the second bit as the signal RST_BIT2. The count value CNT(0) output from the output terminal Q of the flip-flop 400(0) of the 0-th bit is supplied to the sign inversion control unit 401(3) of the third bit as the signal RST_BIT3.

When the gain setting signal GAIN_PARAM represents −1, since the gain is ½-fold, the operation is as follows. The count value CNT(1) output from the output terminal Q of the flip-flop 400(1) of the first bit is supplied to the sign inversion control unit 401(0) of the 0-th bit as the signal RST_BIT0. The count value CNT(2) output from the output terminal Q of the flip-flop 400(2) of the second bit is supplied to the sign inversion control unit 401(1) of the first bit as the signal RST_BIT1. The count value CNT(3) output from the output terminal Q of the flip-flop 400(3) of the third bit is supplied to the sign inversion control unit 401(2) of the second bit as the signal RST_BIT2. A value 0 is supplied to the sign inversion control unit 401(3) of the third bit as the signal RST_BIT3.

When the gain setting signal GAIN_PARAM represents −2, since the gain is ¼-fold, the operation is as follows. The count value CNT(2) output from the output terminal Q of the flip-flop 400(2) of the second bit is supplied to the sign inversion control unit 401(0) of the 0-th bit as the signal RST_BIT0. The count value CNT(3) output from the output terminal Q of the flip-flop 400(3) of the third bit is supplied to the sign inversion control unit 401(1) of the first bit as the signal RST_BIT1. A value 0 is supplied to the sign inversion control unit 401(2) of the second bit as the signal RST_BIT2. A value 0 is supplied to the sign inversion control unit 401(3) of the third bit as the signal RST_BIT3.

When the gain setting signal GAIN_PARAM represents −3, since the gain is ⅛-fold, the operation is as follows. The count value CNT(3) output from the output terminal Q of the flip-flop 400(3) of the third bit is supplied to the sign inversion control unit 401(0) of the 0-th bit as the signal RST_BIT0. A value 0 is supplied to the sign inversion control unit 401(1) of the first bit as the signal RST_BIT1. A value 0 is supplied to the sign inversion control unit 401(2) of the second bit as the signal RST_BIT2. A value 0 is supplied to the sign inversion control unit 401(3) of the third bit as the signal RST_BIT3.

When the gain setting signal GAIN_PARAM represents −4, since the gain is 1/16-fold, the operation is as follows. A value 0 is supplied to the sign inversion control unit 401(0) of the 0-th bit as the signal RST_BIT0. A value 0 is supplied to the sign inversion control unit 401(1) of the first bit as the signal RST_BIT1. A value 0 is supplied to the sign inversion control unit 401(2) of the second bit as the signal RST_BIT2. A value 0 is supplied to the sign inversion control unit 401(3) of the third bit as the signal RST_BIT3.

The counter 104A illustrated in FIG. 4 operates as follows.

First, exposure of an original image is performed as follows. Since the initial state of the input terminal D of the flip-flop 400 is at the L-level, the initial state of the output terminal Q of each flip-flop 400 is at the L-level, and the initial state of the inverting output terminal/Q of each flip-flop 400 is at the H-level. As described above, the least significant bit is a dead bit. The flip-flop 400(1) of the first bit of the counter 104A is as follows in synchronization with a rising edge of the pulse signal PULSE. That is, the positive logic value of the signal input to the input terminal D of the flip-flop 400(1) is output to the output terminal Q of the flip-flop 400(1). Further, the negative logic value of the signal input to the input terminal D of the flip-flop 400(1) is output to the inverting output terminal/Q of the flip-flop 400(1). The flip-flops 400 of the second and subsequent bits of the counter 104A operates as follows in synchronization of the rising edge of the signal output from the inverting output terminal/Q of the flip-flop 400 located on the pre-stage of the flip-flop 400 of interest. That is, the positive logic value of the signal input to the input terminal D of the flip-flop 400 of interest is output to the output terminal Q of the flip-flop 400 of interest. Further, the negative logic value of the signal input to the input terminal D of the flip-flop 400 of interest is output to the inverting output terminal/Q of the flip-flop 400 of interest. In such a way, the counter 104A illustrated in FIG. 4 may operate as an asynchronous counter.

Exposure of a black image is then performed as follows. When performing exposure of a black image, initial setting is performed as follows. In the initial setting, the control unit 606 sets the gain setting signal GAIN_PARAM and sets the inversion signal INV to the H-level. The gain setting unit 403 performs a bit shift on the count values CNT(0) to CNT(3) of respective bits based on the gain setting signal GAIN_PARAM. In such a way, a signal obtained by performing a bit shift on a signal output from the output terminal Q of each flip-flop 400 is supplied to the preset terminal PRST and a reset terminal RST of each flip-flop 400 via the sign inversion control unit 401.

Upon the completion of all the imaging processes, the reset signal CLR supplied from the control unit 606 is set to the H-level, and the counter 104A is reset. When the reset signal CLR is set to the H-level, the output terminal Q of each flip-flop 400 is set to the L-level.

As described above, an asynchronous counter may be used for the counter 104A. The asynchronous counter may perform counting without using a computing unit for addition such as a half-adder or a full-adder. Thus, a use of asynchronous counter for the counter 104A enables further cost reduction.

As described above, according to the present embodiment, since a black image is captured in a state where a signal obtained by inverting a signal of an original image is set for the flip-flops 200 or 400, a black-subtracted image can be obtained without using a frame memory. Moreover, according to the present embodiment, since a gain is applied based on the ratio of the exposure period of an original image and the exposure period of a black image, the time required for acquiring a black-subtracted image can be reduced. Note that the embodiment may be configured by combining an asynchronous counter and a synchronous counter.

Second Embodiment

A solid state imaging device and the control method thereof and an imaging apparatus according to a second embodiment will be described with reference to FIG. 8 and FIG. 9A to FIG. 9C. The same components as those of the solid state imaging device or the like according to the first embodiment illustrated in FIG. 1 to FIG. 7 are labeled with the same references, and the description thereof will be omitted or simplified.

A solid state imaging device 600 according to the present embodiment may acquire an image on which a motion blur has been performed. The motion blur is a blur of an image that occurs when an image of a moving object is captured. To emphasize motion of an object, artificial addition of a blur to an image is also referred to as the motion blur. In the present embodiment, although a case where the motion blur is performed by applying an IIR filter in the time direction will be described as an example, the embodiment is not limited thereto.

Figure 8:
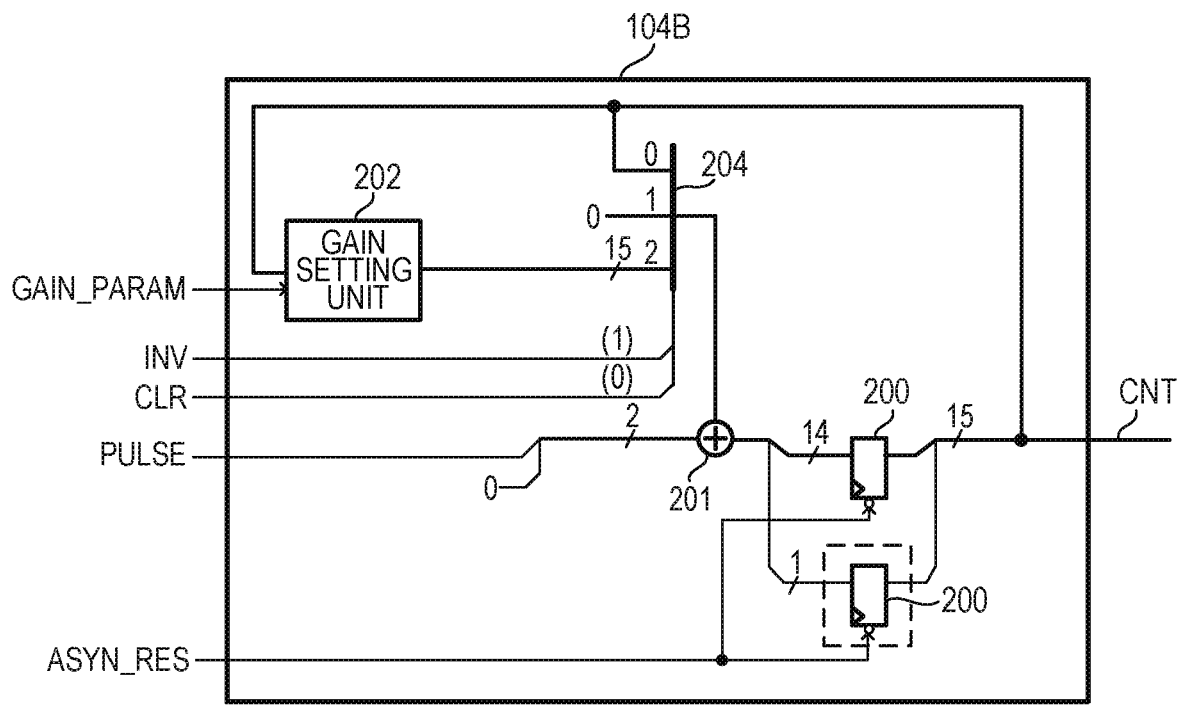
FIG. 8 is a diagram illustrating a counter provided in a unit pixel of a solid state imaging device according to a second embodiment.

FIG. 8 is a diagram illustrating a counter provided in the unit pixel 100 of the solid state imaging device 600 according to the present embodiment. A counter 104B illustrated in FIG. 8 is used instead of the counter 104 illustrated in FIG. 1.

The counter 104B is different from the counter 104 according to the first embodiment illustrated in FIG. 2 in that the sign inversion unit 203 is not provided.

In the present embodiment, a filter coefficient of the IIR filter is set by a gain setting signal GAIN_PARAM. For example, the filter coefficient of the IIR filter is expressed by the following Equation (2) but is not limited thereto.

$$Odat/(1-\alpha)=CurrentDat+\alpha/(1-\alpha)\times PreDat \quad (2)$$

The expression "Odat" represents an output signal of the unit pixel 100. The expression "CurrentDat" represents an output signal of a current frame. The expression "PreDat" represents an output signal of a previous frame. The expression "$\alpha/(1-\alpha)$" represents the filter coefficient. The expression "$\alpha/(1-\alpha)$" is set by the gain setting signal GAIN_PARAM. Note that Odat may be divided by $(1-\alpha)$ in the gain setting unit 202, or Odat may be divided by $(1-\alpha)$ on the post-stage of the unit pixel 100. With an appropriate setting of the gain setting signal GAIN_PARAM, the signal value of the previous frame can be suitably added to the signal value of the current frame.

Figure 9A:
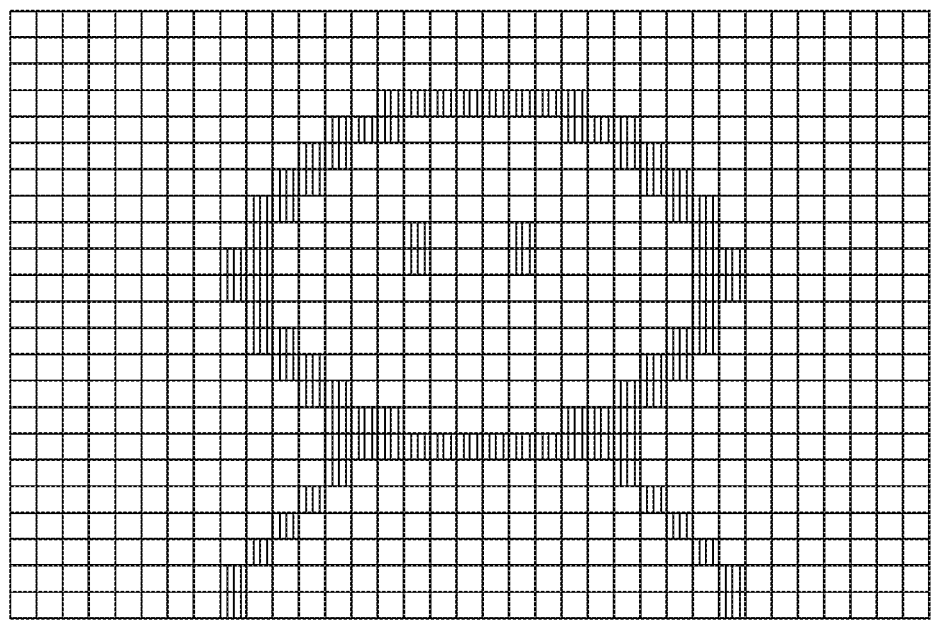
FIG. 9A is a diagram conceptually illustrating a motion blur.
Figure 9B:
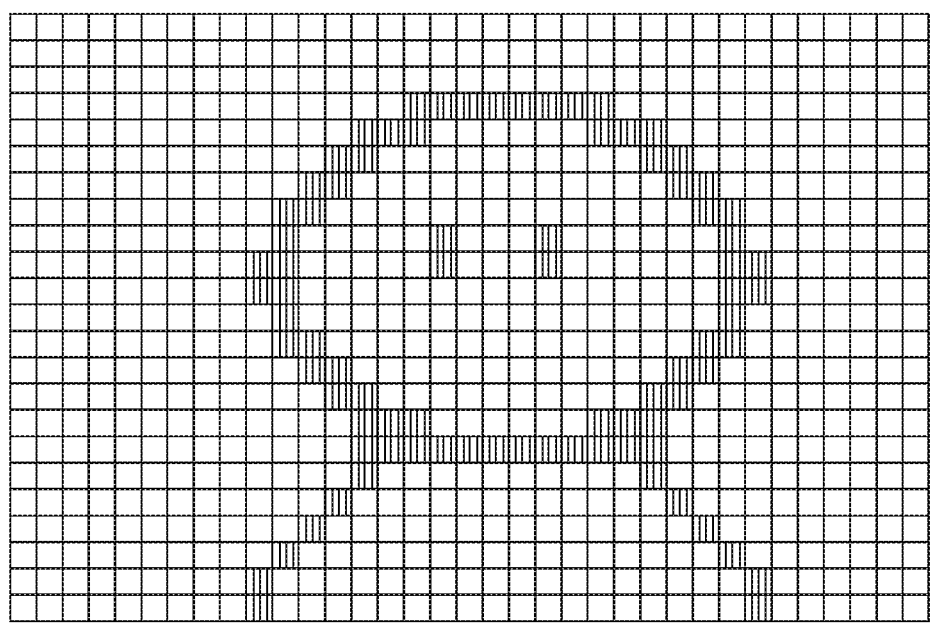
FIG. 9B is another diagram conceptually illustrating a motion blur.
Figure 9C:
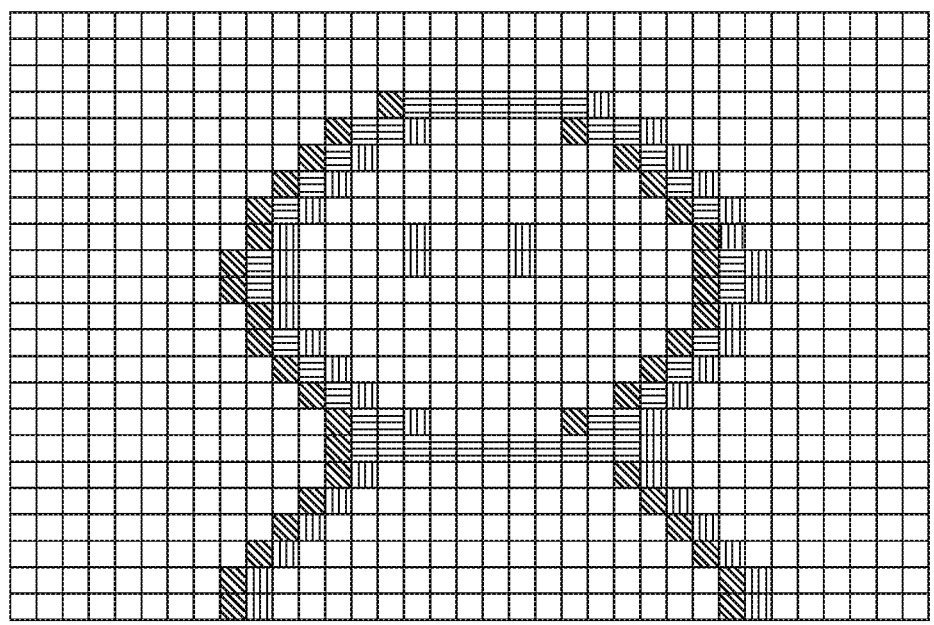
FIG. 9C is yet another diagram conceptually illustrating a motion blur.

FIG. 9A to FIG. 9C are diagrams conceptually illustrating a motion blur. FIG. 9A to FIG. 9C illustrate extracted information indicating an outline of an object, that is, extracted outline information. FIG. 9A conceptually illustrates an image of the previous frame. FIG. 9B and FIG. 9C conceptually illustrate examples in which the position of an object is shifted by one pixel to the right with respect to the image illustrated in FIG. 9A. FIG. 9B illustrates an example in which no motion blur is performed. FIG. 9C corresponds to an example in which a motion blur is performed, that is, an image acquired by the present embodiment.

Each of the plurality of images forming a moving image is captured in a limited exposure time period. When the plurality of images captured in such a way are continuously displayed, an image that appears to be moving is recognized by a viewer due to a residual image effect. In general, when approximately 20 or more images (static images) that change little by little are displayed within one second, an image that appears to be smoothly moving is recognized by a viewer. When the number of displayed images is less than approximately 20 per second, an image that appears to be discontinuously moving may be recognized by a viewer. Further, when the motion of the object is fast, an image that appears to be discontinuously moving may be recognized by a viewer.

As illustrated in FIG. 9B, in a case of the image on which no motion blur is performed, an image that appears to be discontinuously moving is likely to be recognized by a viewer. In contrast, when the image as illustrated in FIG. 9C on which the motion blur is performed is generated by composing the previous frame image as illustrated in FIG. 9A and the current frame image as illustrated in FIG. 9B, an image that appears to be discontinuously moving is less likely to be recognized by a viewer. In the present embodiment, the initial value of a counter is set by suitably setting the filter coefficient, and the motion blur is performed without using a frame memory. A diagonally hatched portion of FIG. 9C is an outline corresponding to only the previous frame. A vertically hatched portion of FIG. 9C is an outline corresponding to only the current frame. A horizontally hatched portion of FIG. 9C is an outline corresponding to both the previous frame and the current frame.

With generation of such an image, missing of information between the previous frame and the current frame can be reduced. According to the present embodiment, it is also possible to easily obtain an image such as an image of star trail without using an image composite tool or the like, for example.

In such a way, according to the present embodiment, a value obtained by applying a predetermined gain to the value of the previous frame is set as the initial value of the counter 104B. Thus, according to the present embodiment, an image on which the motion blur is performed can be acquired without using a frame memory.

Note that, although the case of performing motion blur expression has been described above as an example, the embodiment is not limited thereto. For example, it is also possible to acquire a multiple-exposure image. By using, as the initial value of the counter 104B, a value obtained by applying a predetermined gain to a value of one captured image to capture another image, a multiple-exposure image can be obtained. Further, a high dynamic range (HDR) image can also be obtained. For example, image capturing is performed by using, as the initial value of the counter 104B, a value obtained by applying a gain in accordance with the ratio of the aperture value in the already captured frame and the aperture value of the frame to be captured to the value of the already captured frame. By performing image capturing in such a way, it is possible to obtain an HDR image.

As described above, according to the present embodiment, it is possible to obtain a composite image of a plurality of frames without using a frame memory.

Third Embodiment

A solid state imaging device and the control method thereof and an imaging apparatus according to a third embodiment will be described with reference to FIG. 10 to FIG. 13. The same components as those of the solid state imaging device or the like according to the first or second embodiment illustrated in FIG. 1 to FIG. 9C are labeled with the same references, and the description thereof will be omitted or simplified.

The solid state imaging device according to the present embodiment may acquire a black-subtracted image.

Figure 10:
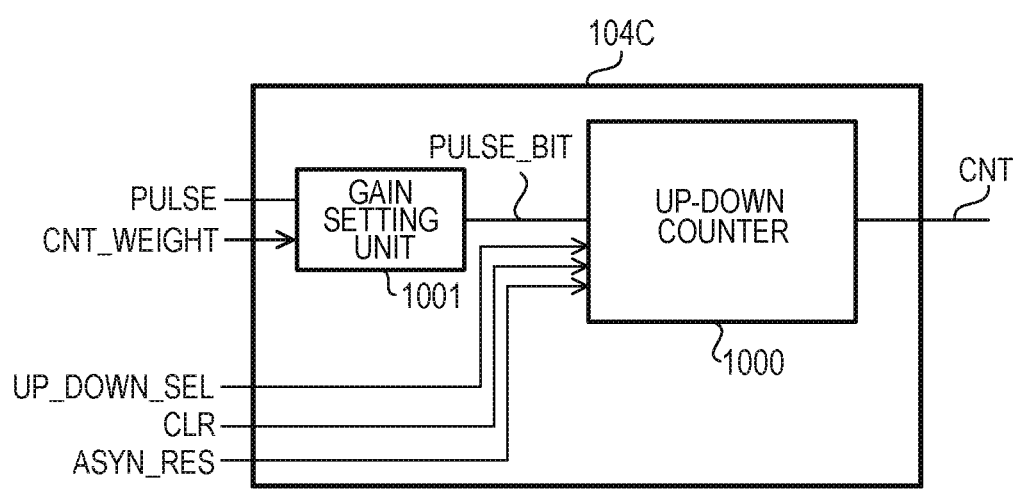
FIG. 10 is a diagram illustrating a counter provided in a unit pixel of a solid state imaging device according to a third embodiment.

FIG. 10 is a diagram illustrating a counter provided in the unit pixel 100 of the solid state imaging device 600 according to the present embodiment.

A counter 104C has an up-down counter 1000 and a gain setting unit 1001. The count value CNT is output from the counter 104C.

The up-down counter 1000 counts the pulse signal PULSE output from the waveform shaper 103. The up-down counter 1000 performs up-count or down-count based on an up-down selection signal UP_DOWN_SEL supplied from the control unit 606. The up-down counter 1000 is initialized to an initial value 0 asynchronously to the clock signal CLK (see FIG. 3) by the asynchronous reset signal ASYN_RES. The up-down counter 1000 is initialized to an initial value 0 in synchronization with the clock signal CLK by the reset signal CLR. Note that, also in the present embodiment, a common clock signal CLK is supplied to the counter 104C provided in each of the plurality of unit pixels 100 provided in the solid state imaging device 600. Further, also in the present embodiment, a common asynchronous reset signal ASYN_RES is simultaneously supplied to the counter 104C provided in each of the plurality of unit pixels 100 provided in the solid state imaging device 600.

The gain setting unit 1001 applies a gain to the one-bit pulse signal PULSE based on a gain setting signal CNT_WEIGHT supplied from the control unit 606. The gain setting unit 1001 sets a gain to be applied to the pulse signal PULSE in accordance with the bit of the up-down counter 1000 to which the signal PULSE_BIT in accordance with the pulse signal PULSE is supplied. For example, when no gain is applied to the pulse signal PULSE, the gain setting unit 1001 supplies the pulse signal PULSE to the 0-th bit of the up-down counter 1000. When a two-fold gain is applied to the pulse signal PULSE, for example, the gain setting unit 1001 supplies the pulse signal PULSE to the first bit of the up-down counter 1000. When a three-fold gain is applied to the pulse signal PULSE, for example, the gain setting unit 1001 supplies the pulse signal PULSE to the 0-th bit of the up-down counter 1000 and the first bit of the up-down counter 1000.

In the present embodiment, up-count is performed during an image capturing period of an original image. Then, during an image capturing period of a black image, down-count is performed by using the signal PULSE_BIT obtained by applying a gain in accordance with the ratio of the exposure value of the original image and the exposure value of the black image to the pulse signal PULSE. In such a way, a black-subtracted image is produced. Note that, although a case where the gain in accordance with the ratio of the exposure value of an original image and the exposure value of a black image is two-fold is described as an example in the present embodiment, the embodiment is not limited thereto.

Figure 11:
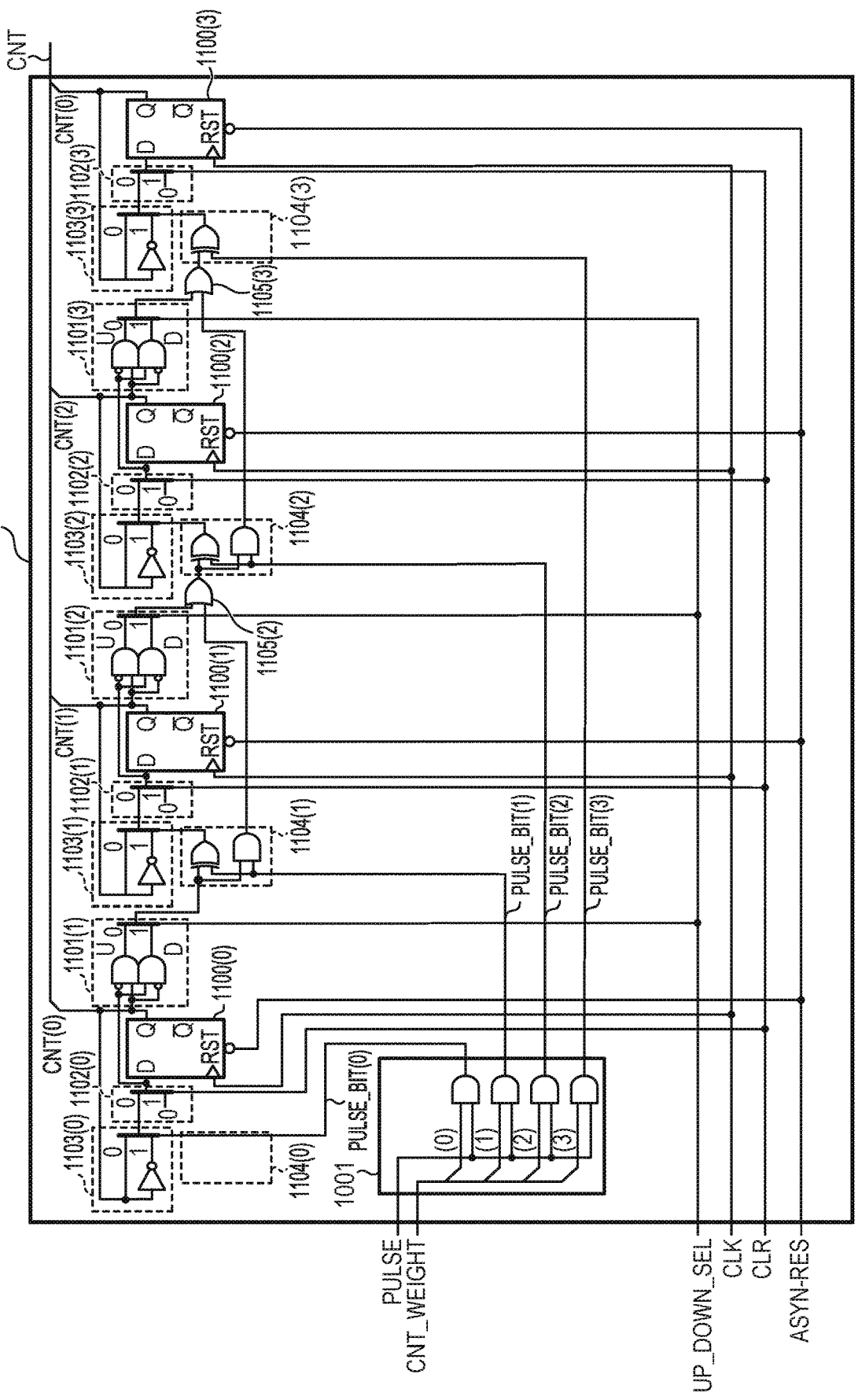
FIG. 11 is a diagram illustrating the counter provided in the unit pixel of the solid state imaging device according to the third embodiment.

FIG. 11 is a diagram illustrating the counter 104C provided in the unit pixel 100 of the solid state imaging device 600 according to the present embodiment. The counter 104C illustrated in FIG. 11 is used instead of the counter 104 illustrated in FIG. 1.

The counter 104C has the gain setting unit 1001, a plurality of flip-flops 1100(0) to 1100(3), a plurality of up-down selector units 1101(1) to 1101(3), and a plurality of synchronous reset units 1102(0) to 1102(3). The counter 104C further has a plurality of HOLD selectors 1103(0) to 1103(3), a plurality of half-adders 1104(0) to 1104(3), and a plurality of OR elements 1105(2) and 1105(3). The count value CNT is output from the counter 104C. Although illustration is provided with an example of a case where the counter 104C is a 4-bit asynchronous counter in the present embodiment, the embodiment is not limited thereto.

When a flip-flop is described in a general sense, a reference 1100 is used, and when an individual flip-flop is described, any one of references 1100(0) to 1100(3) is used. Further, when an up-down selector unit is described in a general sense, a reference 1101 is used, and when an individual up-down selector unit is described, any one of references 1101(1) to 1101(3) is used. Further, when a synchronous reset unit is described in a general sense, a reference 1102 is used, and when an individual synchronous reset unit is described, any one of references 1102(0) to 1102(3) is used. Further, when a HOLD selector is described in a general sense, a reference 1103 is used, and when an individual HOLD selector is described, any one of references 1103(0) to 1103(3) is used. Further, when a half-adder is described in a general sense, a reference 1104 is used, and when an individual half-adder is described, any one of references 1104(0) to 1104(3) is used. Further, when an OR element is described in a general sense, a reference 1105 is used, and when an individual OR element is described, any one of references 1105(2) and 1105(3) is used. The count value CNT(0) of the 0-th bit is output from the flip-flop 1100(0). The count value CNT(1) of the first bit is output from the flip-flop 1100(1). The count value CNT(2) of the second bit is output from the flip-flop 1100(2). The count value CNT(3) of the third bit is output from the flip-flop 1100(3).

The ratio of the exposure period of an original image and the exposure period of a black image is 2:1, for example, in the same manner as described above.

Signals output from the synchronous reset units 1102(0) to 1102(3) are supplied to the input terminals D of the flip-flops 1100(0) to 1100(3), respectively. When the asynchronous reset signal ASYN_RES input to the reset terminal RST is at the L-level, the flip-flop 1100 sets the output terminal Q to the L-level and sets the inverting output terminal/Q to the H-level. When the asynchronous reset signal ASYN_RES input to the reset terminal RST is at the H-level, the flip-flop 1100 operates as follows. That is, in such a case, the flip-flop 1100 outputs the positive logic value of the signal input to the input terminal D to the output terminal Q in synchronous with a rising edge of the clock signal CLK input to the clock input terminal.

The signal output from the synchronous reset unit 1102(0) and the signal output from the output terminal Q of the flip-flop 1100(0) are supplied to the up-down selector unit 1101(1). The signal output from the synchronous reset unit 1102(1) and the signal output from the output terminal Q of the flip-flop 1100(1) are supplied to the up-down selector unit 1101(2). The signal output from the synchronous reset unit 1102(2) and the signal output from the output terminal Q of the flip-flop 1100(2) are supplied to the up-down selector unit 1101(3).

The up-down selector unit 1101 selects up-count or down-count based on the up-down selection signal UP_DOWN_SEL supplied from the control unit 606. When the up-down selection signal UP_DOWN_SEL is 0 (L-level), the up-down selector unit 1101 performs up-count. In up-count, the up-down selector unit 1101 notifies the higher bit of carry in synchronization with a falling edge of a signal output from the output terminal Q of the flip-flop 1100.

When the up-down selection signal UP_DOWN_SEL is 1 (H-level), the up-down selector unit 1101 performs down-count. In down-count, the up-down selector unit 1101 notifies the higher bit of borrow in synchronization with a rising edge of a signal output from the output terminal Q of the flip-flop 1100.

The gain setting signal CNT_WEIGHT supplied from the control unit 606 and the pulse signal PULSE supplied from the waveform shaper 103 are supplied to the gain setting unit 1001. The gain setting unit 1001 sets a bit of the flip-flop 1100 to which the signals PULSE_BIT(0) to (3) in accordance with the pulse signal PULSE are input based on the gain setting signal CNT_WEIGHT. The signal PULSE_BIT(0) to PULSE(3) output from the gain setting unit 1001 are supplied to the half-adder 1104(0) to 1104(3). When a signal output from the gain setting unit 1001 is described in a general sense, a reference PULSE_BIT is used, and when an individual signal output from the gain setting unit 1001 is described, any one of references PULSE_BIT(0) to PULSE_BIT(3) is used. For example, when the gain setting signal CNT_WEIGHT represents 3, the gain setting unit 1001 supplies the signal PULSE_BIT(0) to the 0-th bit and supplies the signal PULSE_BIT(1) to the first bit. When a gain is set in such a way, the count value CNT changes as 0, 3, 6, . . . , and so on.

The signals output from the output terminal Q of the flip-flops 1100(0) to 1100(3) are supplied to the HOLD selectors 1103(0) to 1103(3). Further, control signals from the half-adders 1104(0) to 1104(3) are supplied to the HOLD selectors 1103(0) to 1103(3), respectively. The HOLD selector 1103 outputs the signal supplied from the output terminal Q of the flip-flop 1100 or the inverse signal thereof based on the control signal supplied from the half-adder 1104.

An XOR element is provided in each of the half-adders 1104(1) to 1104(3). When the control signals supplied from the XOR elements provided in the half-adders 1104(1) to 1104(3) to the HOLD selectors 1103(1) to 1103(3), respectively, are 0 (L-level), the HOLD selectors 1103(1) to 1103(3) operate as follows. That is, in such a case, the HOLD selectors 1103(1) to 1103(3) output signals output from the output terminals Q of the flip-flops 1100(1) to 1100(3), respectively. That is, when carry or borrow is not notified from the lower bit and the signals PULSE_BIT(1) to (3) are not supplied, the HOLD selectors 1103(1) to 1103(3) operate as follows. That is, in such a case, the HOLD selectors 1103(1) to 1103(3) output signals output from the output terminals Q of the flip-flops 1100(1) to (3), respectively. Further, when carry or borrow is notified from the lower bit and the signals PULSE_BIT(1) to (3) are supplied, the HOLD selectors 1103(1) to 1103(3) operate as follows. That is, in such a case, the HOLD selectors 1103(1) to 1103(3) output signals output from the output terminals Q of the flip-flops 1100(1) to 1100(3), respectively.

When the control signal supplied from the half-adder 1104 to the HOLD selector 1103 is 1 (H-level), the HOLD selectors 1103(1) to (3) operate as follows. That is, in such a case, the HOLD selectors 1103(1) to (3) output signals obtained by inverting signals output from the output terminals Q of the flip-flops 1100(1) to (3). That is, when only one of the notification from the lower bit indicating carry or borrow and the supply of the signals PULSE_BIT(1) to (3) occurs, the HOLD selectors 1103(1) to 1103(3) operate as follows. That is, in such a case, the HOLD selectors 1103(1) to 1103(3) output signals obtained by inverting the signals output from the output terminal Q of the flip-flops 1100(1) to 1100(3).

Note that, although an example in which a NOT element is provided in the HOLD selector 1103 is illustrated in FIG. 11, the embodiment is not limited thereto. For example, a signal output from the inverting output terminal/Q of the flip-flop 1100 may be used. In the flip-flop 1100(0) of the 0-th bit that is the least significant bit, carry or borrow is not notified from the lower bit. Thus, the signal PULSE_BIT(0) is supplied to the HOLD selector 1103(0) as a control signal from the half-adder 1104(0). When the signal PULSE_BIT (0) is 0 (L-level), the HOLD selector 1103(0) outputs a signal output from the output terminal Q of the flip-flop 1100(0). When the signal PULSE_BIT(0) is 1 (H-level), the HOLD selector 1103(0) outputs a signal obtained by inverting a signal output from the output terminal Q of the flip-flop 1100(0).

Each of the half-adders 1104(1) and 1104(2) has an XOR element and an AND element. The half-adder 1104(2) has an XOR element. The signals output from the up-down selector units 1101(1) to 1101(3) and the signals PULSE_BIT(1) to PULSE_BIT(3) in accordance with the pulse signal PULSE are supplied to the half-adders 1104(1) to 1104(3), respectively. The half-adders 1104(1) to 1104(3) supply control signals to the HOLD selector 1103 based on the notification from the lower bit indicating carry or borrow and the signals PULSE_BIT(1) to PULSE_BIT(3) in accordance with the pulse signal PULSE. The half-adders 1104(1) and 1104(2) notify the higher bit of carry or borrow independently of the notification output from the up-down selector units 1101(2) and 1101(3). The HOLD selectors 1103(1) to 1103(3) are controlled by the signals output from the XOR elements provided in the half-adders 1104(1) to 1104(3).

When only one of the notification from the lower bit indicating carry or borrow and the supply of the signals PULSE_BIT(1) to (3) occurs, the operation is as follows. That is, the values of the signals output from the output terminals Q of the flip-flops 1100(1) to 1100(3) are inverted by the HOLD selectors 1103(1) to 1103(3). Carry or borrow is notified from the lower bit by each signal output from the AND elements provided in the half-adders 1104(1) and 1104(2).

When both the notification from the lower bit indicating carry or borrow and the supply of the signals PULSE_BIT in accordance with the pulse signal PULSE occur simultaneously, the operation is as follows. That is, the value of the output terminal Q of the flip-flop 1100 provided to the bit of interest is not inverted, and the higher bit is notified of carry or borrow. Thus, the higher bit is notified of carry or borrow by the signal output from the AND element provided in the half-adder 1104. At the least significant bit, neither carry from the bit lower than the bit of interest nor borrow to the bit lower than the bit of interest occurs. Thus, the half-adder 1104(0) supplies the signal PULSE_BIT(0) to the HOLD selector 1103(0) as a control signal without change. At the most significant bit, neither carry to the bit higher than the bit of interest nor borrow from the bit higher than the bit of interest occurs. Thus, no AND element is provided in the half-adder 1104(3).

The OR element 1105(2) is supplied with the signal output from the AND element of the half-adder 1104(1) and the signal output from the up-down selector unit 1101(2). A notification from the lower bit indicating carry or borrow is provided by these signals. The signal output from OR element 1105(2) is supplied to the half-adder 1104(2). The OR element 1105(3) is supplied with the signal output from the AND element of the half-adder 1104(2) and the signal output from the up-down selector unit 1101(3). A notification from the lower bit indicating carry or borrow is provided by these signals. The signal output from OR element 1105(3) is supplied to the half-adder 1104(3).

In a case of up-count, a notification from the lower bit indicating carry or borrow is provided in synchronization with a falling edge of the signal output from the output terminal Q of the flip-flop 1100 located at the lower bit. In a case of down-count, a notification from the lower bit indicating carry or borrow is provided in synchronization with a rising edge of the signal output from the output terminal Q of the flip-flop 1100 located at the lower bit. Further, regardless of up-count or down-count, a notification of carry or borrow is provided also when the notification of carry or borrow and the input of the signal PULSE_BIT are performed simultaneously on a bit lower by 2 bits. Thus, the logic sum of the signal from the up-down selector unit 1101 and the signal from the AND element of the half-adder 1104 is output from each of the OR elements 1105(2) and 1105(3).

The synchronous reset unit 1102 initializes the value of the output terminal Q of the flip-flop 1100 to 0 (L-level) in synchronization with a clock signal CLK based on the reset signal CLR supplied from the control unit 606.

As described above, the counter 104C illustrated in FIG. 11 can perform up-down count while changing a weight of the pulse signal PULSE.

Figure 12:
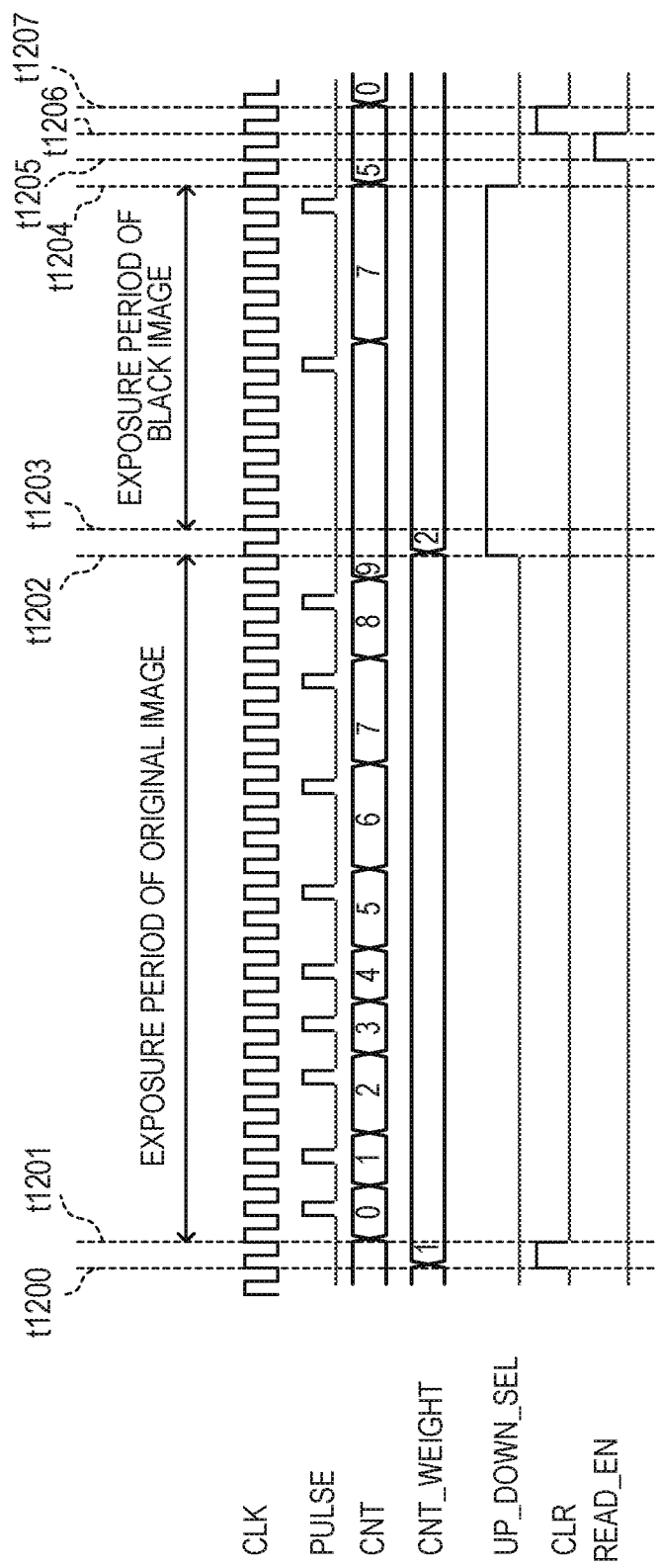
FIG. 12 is a timing chart illustrating the operation of the counter provided in the unit pixel of the solid state imaging device according to the third embodiment.

FIG. 12 is a timing chart illustrating the operation of the counter 104C provided in the unit pixel 100 of the solid state imaging device 600 according to the present embodiment. FIG. 12 illustrates the clock signal CLK, the pulse signal PULSE, the count value CNT, the gain setting signal CNT_WEIGHT, the up-down selection signal UP_DOWN_SEL, the reset signal CLR, and the read signal READ_EN.

Since the count value CNT is output in synchronization with a rising edge of the clock signal CLK, a delay by one cycle occurs in the count value CNT.

At timing t1200, the reset signal CLR is set to the H-level. Thereby, the counter 104C is reset. Such a reset process is performed before an original image is exposed.

The period from timing t1201 to timing t1202 is an exposure period of an original image. In the exposure period of the original image, the up-down selection signal UP_DOWN_SEL is set to the L-level in order to perform up-count. Further, when an original image is exposed, since no gain is applied to the pulse signal PULSE, the gain setting signal CNT_WEIGHT is set to 1. Thus, the pulse signal PULSE is input to the 0-th bit that is the least significant bit of the up-down counter 1000. Thus, every time a single pulse signal PULSE is output, the count value CNT is counted up one by one. Note that an example in which a single pulse signal PULSE is output at a timing of a rising edge of the clock signal CLK is illustrated to simplify the illustration here.

At timing t1202, the exposure of the original image is completed. To proceed to exposure of a black image, the counter 104C is set. The gain setting signal CNT_WEIGHT is set based on the ratio of the exposure period of the original image corresponding to the previous frame and the exposure period of a black image corresponding to the next exposure frame. As described above, since the ratio of the exposure period of an original image and the exposure period of a black image is 2:1, a two-fold gain corresponding to the ratio is applied. That is, the gain setting signal CNT_WEIGHT is set to 2, and thereby the pulse signal PULSE is input to the first bit of the up-down counter 1000. With such an operation, in exposure of a black image, exposure is performed at a slope that is twice the slope of exposure of an original image. Further, when a black image is exposed, the up-down selection signal UP_DOWN_SEL is set to the H-level in order to perform down-count. With such an operation, in exposure of a black image, subtraction of the pulse signal PULSE is performed at a slope that is twice the slope of exposure of an original image.

The period from timing t1203 to timing t1204 is an exposure period of a black image. Every time the pulse signal PULSE is output from the waveform shaper 103, the count value CNT is counted down two by two.

At timing t1204, the exposure of the black image is completed. At timing t1204, the up-down selection signal UP_DOWN_SEL is set to the L-level.

From timing t1204 to timing t1205, the count value CNT is fixed. Herein, the value of the count value CNT becomes 5, for example. In such a way, the count value CNT indicating the signal value of a black-subtracted image is obtained.

At timing t1205, the read signal READ_EN is controlled to the H-level, and the signal of a black-subtracted image is read.

At timing t1206, the reset signal CLR is controlled to the H-level. Thereby, at timing t1207 next to timing t1206, the count value CNT is reset to 0.

As described above, also in the present embodiment, it is possible to acquire a difference value between a signal value in an image capturing period of one frame and a signal value in an image capturing period of the previous frame of the one frame without using a frame memory.

Note that, although the case where the counter 104C is a synchronous counter has been described above as an example, the embodiment is not limited thereto. For example, a counter 104D as illustrated in FIG. 13, that is, an asynchronous counter may be used.

Figure 13:
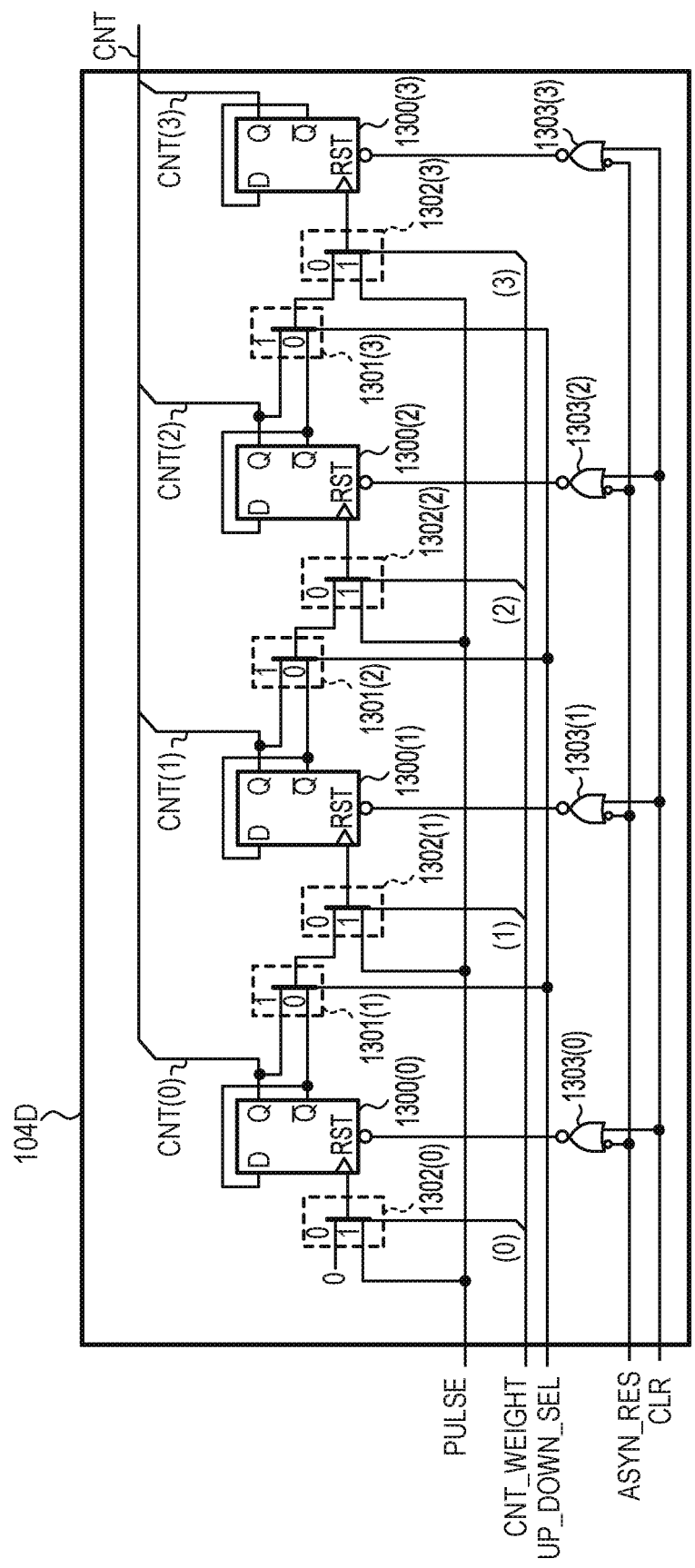
FIG. 13 is a diagram illustrating an example when the counter is formed of an asynchronous counter.

FIG. 13 is a diagram illustrating an example of a case where the counter is formed of an asynchronous counter. The counter 104D illustrated in FIG. 13 is used instead of the counter 104 illustrated in FIG. 1.

The counter 104D has a plurality of flip-flops 1300(0) to 1300(3), a plurality of count scheme control units 1301(1) to 1301(3), and a plurality of input bit selection units 1302(0) to 1302(3). The counter 104D further has OR elements 1303(0) to 1303(3). The count value CNT is output from the counter 104D. Although a case where the counter 104D is a 4-bit asynchronous counter is described as an example here, the embodiment is not limited thereto.

When a flip-flop is described in a general sense, a reference 1300 is used, and when an individual flip-flop is described, any one of references 1300(0) to 1300(3) is used. When a count scheme control unit is described in a general sense, a reference 1301 is used, and when an individual count scheme control unit is described, any one of references 1301(1) to 1301(3) is used. When an input bit selection unit is described in a general sense, a reference 1302 is used, and when an individual input bit selection unit is described, any one of references 1302(0) to 1302(3) is used. When an OR element is described in a general sense, a reference 1303 is used, and when an individual OR element is described, any one of references 1303(0) to 1303(3) is used. When a count value is described, a reference CNT is used, and when each bit value of a count value is described, any one of references CNT(0) to CNT(3) is used. The count value CNT(0) of the 0-th bit is output from the flip-flop 1300(0). The count value CNT(1) of the first bit is output from the flip-flop 1300(1). The count value CNT(2) of the second bit is output from the flip-flop 1300(2). The count value CNT(3) of the third bit is output from the flip-flop 1300(3). The ratio of the exposure period of an original image and the exposure period of a black image is 2:1, for example, in the same manner as described above.

The flip-flop 1300 is reset when a L-level signal is input to the reset terminal RST. When the signal input to the reset terminal RST is at the L-level, the flip-flop 1300 sets the output terminal Q to the L-level and sets the inverting output terminal/Q to the H-level. When the signal input to the reset terminal RST is at the H-level, the flip-flop 1300 operates as follows in synchronization with a rising edge of the signal input to the clock input terminal. That is, in such a case, the flip-flop 1300 outputs the positive logic value of the signal input to the input terminal D to the output terminal Q and outputs the negative logic value of the signal input to the input terminal D to the inverting output terminal/Q. The inverting output terminal/Q of the flip-flop 1300 is connected to the input terminal D of the flip-flop 400 having the inverting output terminal/Q of interest. The count values CNT(0) to CNT(3) of respective bits are output from respective output terminals Q of the flip-flops 1300(0) to 1300(3). The signal output from the input bit selection unit 1302 is supplied to the clock input terminal of the flip-flop 1300.

The input bit selection unit 1302(0) outputs 0 (L-level) or a PULSE signal based on the gain setting signal CNT_WEIGHT. When the value of the 0-th bit of the gain setting signal CNT_WEIGHT is 0, the input bit selection unit 1302(0) outputs 0. When the value of the 0-th bit of the gain setting signal CNT_WEIGHT is 1, the input bit selection unit 1302(0) outputs the pulse signal PULSE. The input bit selection units 1302(1) to 1302(3) output the signals supplied from the count scheme control units 1301(1) to 1301(3) or the PULSE signal based on the gain setting signal CNT_WEIGHT. When the value of the first bit of the gain setting signal CNT_WEIGHT is 0, the input bit selection unit 1302(1) outputs the signal supplied from the count scheme control unit 1301(1). When the value of the first bit of the gain setting signal CNT_WEIGHT is 1, the input bit selection unit 1302(1) outputs the pulse signal PULSE. When the value of the second bit of the gain setting signal CNT_WEIGHT is 0, the input bit selection unit 1302(2) outputs the signal supplied from the count scheme control unit 1301(2). When the value of the second bit of the gain setting signal CNT_WEIGHT is 1, the input bit selection unit 1302(2) outputs the pulse signal PULSE. When the value of the third bit of the gain setting signal CNT_WEIGHT is 0, the input bit selection unit 1302(3) outputs the signal supplied from the count scheme control unit 1301(3). When the value of the third bit of the gain setting signal CNT_WEIGHT is 1, the input bit selection unit 1302(3) outputs the pulse signal PULSE. For example, when the value of the gain setting signal CNT_WEIGHT is set to 2, the pulse signal PULSE is input to the flip-flop 1300(1) of the first bit, and the count value CNT changes two by two.

The count scheme control unit 1301 controls a count scheme based on the up-down selection signal UP_DOWN_SEL. When the up-down selection signal UP_DOWN_SEL is at the L-level, the count scheme control unit 1301(1) supplies the signal output from the inverting output terminal/Q of the flip-flop 1300(0) to the input bit selection unit 1302(1). Further, when the up-down selection signal UP_DOWN_SEL is at the L-level, the count scheme control unit 1301(2) supplies the signal output from the inverting output terminal/Q of the flip-flop 1300(1) to the input bit selection unit 1302(2). Further, when the up-down selection signal UP_DOWN_SEL is at the L-level, the count scheme control unit 1301(3) supplies the signal output from the inverting output terminal/Q of the flip-flop 1300(3) to the input bit selection unit 1302(3).

In such a way, when the up-down selection signal UP_DOWN_SEL is at the L-level, the operation of up-count is performed by the counter 104D. When the up-down selection signal UP_DOWN_SEL is at the H-level, the count scheme control unit 1301(1) supplies the signal output from the output terminal Q of the flip-flop 1300(0) to the input bit selection unit 1302(1). Further, when the up-down selection signal UP_DOWN_SEL is at the H-level, the count scheme control unit 1301(2) supplies the signal output from the output terminal Q of the flip-flop 1300(1) to the input bit selection unit 1302(2). Further, when the up-down selection signal UP_DOWN_SEL is at the H-level, the count scheme control unit 1301(3) supplies the signal output from the output terminal Q of the flip-flop 1300(3) to the input bit selection unit 1302(3). In such a way, when the up-down selection signal UP_DOWN_SEL is at the H-level, the operation of down-count is performed by the counter 104D.

The OR element 1303 generates a signal used for resetting the flip-flop 1300. When the asynchronous reset signal ASYN_RES is at the L-level or when the reset signal CLR is at the H-level, the flip-flop 1300 is reset.

The counter 104D as illustrated in FIG. 13 operates as follows.

First, exposure of an original image is performed as follows. The control unit 606 controls the up-down selection signal UP_DOWN_SEL to 0 (L-level) in order to cause the counter 104D to perform up-count. Further, the control unit 606 controls the value of the gain setting signal CNT_WEIGHT to 1. Since the up-down selection signal UP_DOWN_SEL is set to the L-level, the operation is as follows. The signal output from the inverting output terminal/Q of the flip-flop 1300(0) is output from the count scheme control unit 1301(1). Further, the signal output from the inverting output terminal/Q of the flip-flop 1300(1) is output from the count scheme control unit 1301(2). Further, the signal output from the inverting output terminal/Q of the flip-flop 1300(2) is output from the count scheme control unit 1301(3). Since the value of the gain setting signal CNT_WEIGHT is set to 1, the pulse signal PULSE is supplied to the clock input terminal of the flip-flop 1300(0) of the 0-th bit that is the least significant bit. The signal output from the inverting output terminal/Q of the flip-flop 1300(0) of the 0-th bit is supplied to the clock input terminal of the flip-flop 1300(1) of the first bit. The signal output from the inverting output terminal/Q of the flip-flop 1300(1) of the first bit is supplied to the clock input terminal of the flip-flop 1300(2) of the second bit. The signal output from the inverting output terminal/Q of the flip-flop 1300(2) of the second bit is supplied to the clock input terminal of the flip-flop 1300(3) of the third bit.

Since the initial state of the input terminal D of the flip-flop 1300 is 0 (L-level), the initial state of the output terminal Q of each flop-flop 1300 is 0 (L-level), and the initial state of the inverting output terminal/Q of each flop-flop 1300 is 1 (H-level).

The flip-flop 1300(0) of the 0-th bit operates as follows in synchronization with a rising edge of the pulse signal PULSE. That is, the positive logic value of the signal input to the input terminal D of the flip-flop 1300(0) is output to the output terminal Q of the flip-flop 1300(0). Further, the negative logic value of the signal input to the input terminal D of the flip-flop 1300(0) is output to the inverting output terminal/Q of the flip-flop 1300(0). The flip-flop 1300(1) of the first bit operates as follows in synchronization with a rising edge of the signal output from the inverting output terminal/Q of the flip-flop 1300(0) of the 0-th bit. That is, the positive logic value of the signal input to the input terminal D of the flip-flop 1300(1) is output to the output terminal Q of the flip-flop 1300(1). Further, the negative logic value of the signal input to the input terminal D of the flip-flop 1300(1) is output to the inverting output terminal/Q of the flip-flop 1300(1).

The flip-flop 1300(2) of the second bit operates as follows in synchronization with a rising edge of the signal output from the inverting output terminal/Q of the flip-flop 1300(1) of the first bit. That is, the positive logic value of the signal input to the input terminal D of the flip-flop 1300(2) is output to the output terminal Q of the flip-flop 1300(2). Further, the negative logic value of the signal input to the input terminal D of the flip-flop 1300(2) is output to the inverting output terminal/Q of the flip-flop 1300(2). The flip-flop 1300(3) of the third bit operates as follows in synchronization with a rising edge of the signal output from the inverting output terminal/Q of the flip-flop 1300(2) of the second bit. That is, the positive logic value of the signal input to the input terminal D of the flip-flop 1300(3) is output to the output terminal Q of the flip-flop 1300(3). Further, the negative logic value of the signal input to the input terminal D of the flip-flop 1300(3) is output to the inverting output terminal/Q of the flip-flop 1300(3). In such a way, the counter 104D illustrated in FIG. 13 may operate as an asynchronous counter.

Exposure of a black image is then performed as follows. The control unit 606 controls the up-down selection signal UP_DOWN_SEL to 1 (H-level) in order to cause the counter 104D to perform down-count. Further, the control unit 606 controls the value of the gain setting signal CNT_WEIGHT to 2. Since the up-down selection signal UP_DOWN_SEL is set to the H-level, the operation is as follows. The signal output from the output terminal Q of the flip-flop 1300(0) is output from the count scheme control unit 1301(1). Further, the signal output from the output terminal Q of the flip-flop 1300(1) is output from the count scheme control unit 1301(2). Further, the signal output from the output terminal Q of the flip-flop 1300(2) is output from the count scheme control unit 1301(3). Since the value of the gain setting signal CNT_WEIGHT is set to 2, the operation is as follows. A signal of 0 (L-level) is supplied to the clock input terminal of the flip-flop 1300(0) of the 0-th bit. The pulse signal PULSE is supplied to the clock input terminal of the flip-flop 1300(1) of the first bit. The signal output from the output terminal Q of the flip-flop 1300(1) of the first bit is supplied to the clock input terminal of the flip-flop 1300(2) of the second bit. The signal output from the output terminal Q of the flip-flop 1300(2) of the second bit is supplied to the clock input terminal of the flip-flop 1300(3) of the third bit. Therefore, during the exposure period of a black image, the count value CNT is decremented two by two.

Upon the completion of all the imaging processes, the counter 104D is reset based on the signal supplied from the control unit 606. When the counter 104D is reset, the reset signal CLR is set to the H-level. When the reset signal CLR is set to the H-level, the output terminal Q of each flip-flop 1300 is set to the L-level.

As described above, the counter 104D may be formed of an asynchronous counter. Since the counter 104D formed of an asynchronous counter does not require any computing unit for addition such as a half-adder or a full-adder, this may contribute a further reduction of cost.

As described above, according to the present embodiment, it is possible to perform up-down count while changing the weight of the pulse signal PULSE. Thus, according to the present embodiment, it is possible to obtain a black-subtracted image without using a frame memory.

Fourth Embodiment

A solid state imaging device and the control method thereof and an imaging apparatus according to a fourth embodiment will be described with reference to FIG. 14. The same components as those of the solid state imaging device or the like according to the first to third embodiments illustrated in FIG. 1 to FIG. 13 are labeled with the same references, and the description thereof will be omitted or simplified.

The solid state imaging device according to the present embodiment acquires an HDR image. In the present embodiment, a case of acquiring an HDR image by addition average composition will be described as an example.

Figure 14:
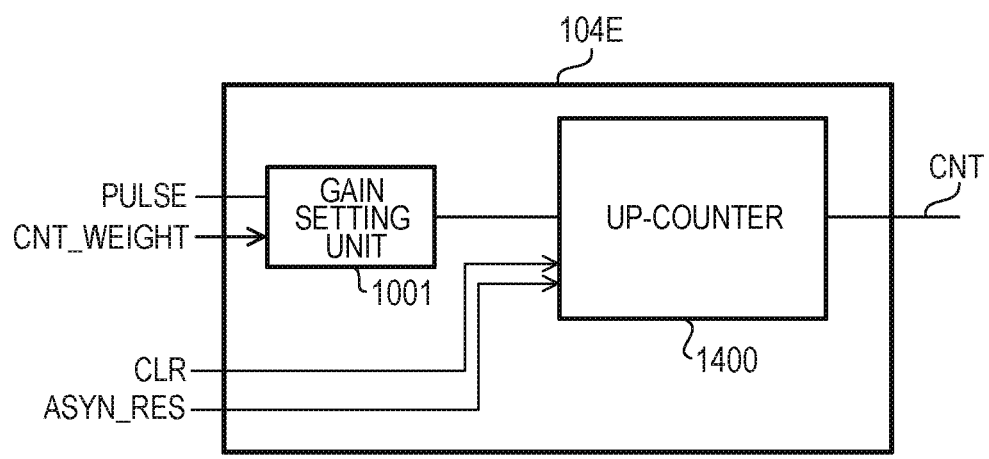
FIG. 14 is a diagram illustrating a counter provided in a unit pixel of a solid state imaging device according to a fourth embodiment.

FIG. 14 is a diagram illustrating a counter provided in the unit pixel 100 of the solid state imaging device 600 according to the present embodiment. A counter 104E illustrated in FIG. 14 is different from the counter 104C according to the third embodiment illustrated in FIG. 10 in that an up-counter 1400 is provided. The up-down counter 1000 (see FIG. 10) is not provided in the counter 104E illustrated in FIG. 14. Further, the up-down selection signal UP_DOWN_SEL is not input to the counter 104E illustrated in FIG. 14.

In general, when image capturing is performed with low exposure, a black underexposure picture image is likely to occur, and when image capturing is performed with high exposure, a white raise is likely to occur. When a black underexposure picture image occurs and when a white raise occurs, original color information on an object is likely to be lost. When a plurality of images with different exposure are added and averaged, it is possible to prevent the color information from being lost. However, when a plurality of images are merely added, a pixel value may become excessively large, and this causes saturation of the pixel value. To prevent saturation of a pixel value, exposure of each of the plurality of images is set to be low. For example, when two images are composed, respective images are captured with exposure that is one step lower than the suitable exposure. In the present embodiment, instead of reducing exposure, the weight of a count is changed. Specifically, a bit to which the pulse signal PULSE is input is shifted to a lower bit, and thereby the weight of a count is changed.

In the present embodiment, the weight of the count in acquisition of a plurality of image signals used for composition is set in accordance with the number of multiple image signals used for composition. For example, when two images are composed, the weight of the count is set to ½. Further, by counting the number of signals generated from the sensor unit at a frequency in accordance with a frequency of photon reception, a plurality of image signals are sequentially acquired.

As described above, according to the present embodiment, the weight of a count can be changed. Thus, according to the present embodiment, an image obtained by adding and averaging a plurality of images, that is, an HDR image can be acquired without requiring a frame memory.

Modified Embodiments

Although the preferred embodiments of the present disclosure have been described above, the present disclosure is not limited to these embodiments, and various modifications and changes are possible within a scope of the spirit thereof.

The aspect of the present disclosure can also be realized by a process of supplying a program that implements one or more functions of the embodiments described above to a system or an apparatus via a network or a storage medium and causing one or more processors in a computer of the system or the apparatus to read and execute the program. Further, the aspect of the present disclosure can also be realized by a circuit that implements one or more functions (for example, ASIC).

According to the present disclosure, it is possible to provide a solid state imaging device, an imaging apparatus, and an imaging method that may acquire a desired image without using a frame memory.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A solid state imaging device comprising:
   a sensor unit that generates pulses at a frequency in accordance with a frequency of photon reception; and
   a counter that generates an image signal by counting the number of pulses outputted from the sensor unit,
   wherein the counter combines a second image signal and a value obtained by performing a predetermined process on a count value obtained in acquisition of a first image signal to generate a third image signal, and
   performs the predetermined process based on a first imaging condition in the acquisition of the first image signal and a second imaging condition in acquisition of the second image signal,
   wherein the value obtained by performing the predetermined process on the count value obtained in the acquisition of the first image signal is a value obtained by inverting a value obtained by multiplying a value in accordance with a ratio based on the first imaging condition and the second imaging condition by the count value obtained by the acquisition of the first image signal; and
   wherein a bit shift is performed to multiply the value in accordance with the ratio based on the first imaging condition and the second imaging condition by the count value obtained in the acquisition of the first image signal.

2. The solid state imaging device according to claim 1, wherein the value obtained by performing the predetermined process on the count value obtained in the acquisition of the first image signal is a value obtained by multiplying a value in accordance with a ratio based on the first imaging condition and the second imaging condition by the count value obtained in the acquisition of the first image signal.

3. The solid state imaging device according to claim 1, wherein the ratio based on the first imaging condition and the second imaging condition is a power of two.

4. The solid state imaging device according to claim 1, wherein the counter comprises an asynchronous counter.

5. The solid state imaging device according to claim 1, wherein the counter comprises a synchronous counter.

6. A solid state imaging device comprising:
   a sensor unit that generates pulses at a frequency in accordance with a frequency of photon reception; and
   a counter that generates an image signal by counting the number of pulses outputted from the sensor unit,
   wherein the counter combines a second image signal and a value obtained by performing a predetermined process on a count value obtained in acquisition of a first image signal to generate a third image signal, and
   wherein the predetermined process multiplies a gain in accordance with a coefficient of a filter by the count value obtained in the acquisition of the first image signal.

7. A solid state imaging device comprising:
   a sensor unit that generates pulses at a frequency in accordance with a frequency of photon reception; and
   a counter that counts the number of pulses outputted from the sensor unit,
   wherein the counter sets a weight of count in acquisition of a second image signal performed after acquisition of a first image signal to differ from a weight of count in the acquisition of the first image signal based on a first imaging condition in the acquisition of the first image signal and a second imaging condition in the acquisition of the second image signal.

8. The solid state imaging device according to claim 7, wherein the weight of count in the acquisition of the second image signal is set in accordance with a ratio based on the first imaging condition and the second imaging condition.

9. The solid state imaging device according to claim 7, wherein a count scheme in the acquisition of the first image signal and a count scheme in the acquisition of the second image signal are different from each other.

10. A solid state imaging device comprising:
    a sensor unit that generates pulses at a frequency in accordance with a frequency of photon reception; and
    a counter that generates an image signal by counting the number of pulses outputted from the sensor unit,
    wherein the counter combines a second image signal and a value obtained by performing a predetermined process on a count value obtained in acquisition of a first image signal to generate a third image signal, and
    wherein a weight of count in acquisition of the image signal is variable through a bit shift in the counter.

11. The solid state imaging device according to claim 10, wherein a weight of count in acquisition of a plurality of image signals used for composition is set in accordance with the number of plurality of image signals used for composition.

* * * * *